(12) United States Patent
Moll

(10) Patent No.: US 7,593,840 B2
(45) Date of Patent: *Sep. 22, 2009

(54) PERIPHERAL BUS SWITCH HAVING VIRTUAL PERIPHERAL BUS AND CONFIGURABLE HOST BRIDGE

(75) Inventor: Laurent R. Moll, Saratoga, CA (US)

(73) Assignee: Broadcom Corporation, Irvine, CA (US)

(*) Notice: Subject to any disclaimer, the term of this patent is extended or adjusted under 35 U.S.C. 154(b) by 488 days.

This patent is subject to a terminal disclaimer.

(21) Appl. No.: 11/446,897

(22) Filed: Jun. 5, 2006

(65) Prior Publication Data

US 2006/0230217 A1      Oct. 12, 2006

Related U.S. Application Data

(60) Division of application No. 10/684,872, filed on Oct. 14, 2003, now Pat. No. 7,096,305, which is a continuation-in-part of application No. 10/439,343, filed on May 15, 2003, now Pat. No. 7,340,546.

(51) Int. Cl.
G06F 9/455 (2006.01)
G06F 13/00 (2006.01)
G06F 13/36 (2006.01)

(52) U.S. Cl. ............ 703/24; 710/104; 710/312
(58) Field of Classification Search ........... 703/24; 710/312, 104
See application file for complete search history.

(56) References Cited

U.S. PATENT DOCUMENTS

| 6,353,867 B1 * | 3/2002 | Qureshi et al. ............ 710/305 |
| 7,096,305 B2 * | 8/2006 | Moll ........................... 710/312 |
| 2003/0037199 A1 * | 2/2003 | Solomon et al. ............ 710/314 |

* cited by examiner

Primary Examiner—Paul L Rodriguez
Assistant Examiner—Dwin M Craig
(74) Attorney, Agent, or Firm—Garlick Harrison & Markison

(57) ABSTRACT

A peripheral bus switch includes a virtual peripheral bus, a plurality of bridges, and a configurable host bridge. A first bridge operably couples on a first side to the virtual peripheral bus and supports connection on a second side to a peripheral bus fabric. A second bridge operably couples on a first side to the virtual peripheral bus and supports connection on a second side to the peripheral bus fabric. The configurable host bridge operably couples to the virtual peripheral bus, supports a host mode of operation in which it serves as a host bridge, and supports a device mode of operation in which it operates as a device.

13 Claims, 16 Drawing Sheets

| MS-4 Addr. Bits | Node Routing Table (Bridge A Entries) - 1100 | | | | |
|---|---|---|---|---|---|
| 0000 | Node 0 | I/O Override bit | P/S | CC Override bit | P/S |
| 0001 | Node 1 | I/O Override bit | P/S | CC Override bit | P/S |
| 0010 | Node 2 | I/O Override bit | P/S | CC Override bit | P/S |
| 0011 | Node 3 | I/O Override bit | P/S | CC Override bit | P/S |
| 0100 | Node 4 | I/O Override bit | P/S | CC Override bit | P/S |
| 0101 | Node 5 | I/O Override bit | P/S | CC Override bit | P/S |
| 0110 | Node 6 | I/O Override bit | P/S | CC Override bit | P/S |
| 0111 | Node 7 | I/O Override bit | P/S | CC Override bit | P/S |
| 1000 | Node 8 | I/O Override bit | P/S | CC Override bit | P/S |
| 1001 | Node 9 | I/O Override bit | P/S | CC Override bit | P/S |
| 1010 | Node 10 | I/O Override bit | P/S | CC Override bit | P/S |
| 1011 | Node 11 | I/O Override bit | P/S | CC Override bit | P/S |
| 1100 | Node 12 | I/O Override bit | P/S | CC Override bit | P/S |
| 1101 | Node 13 | I/O Override bit | P/S | CC Override bit | P/S |
| 1110 | Node 14 | I/O Override bit | P/S | CC Override bit | P/S |
| 1111 | Node 15 | I/O Override bit | P/S | CC Override bit | P/S |

Fig. 11

PERIPHERAL BUS SWITCH HAVING VIRTUAL PERIPHERAL BUS AND CONFIGURABLE HOST BRIDGE

CROSS REFERENCES TO RELATED APPLICATIONS

This application is a divisional application of and claims priority to U.S. Patent Application entitled PERIPHERAL BUS SWITCH HAVING VIRTUAL PERIPHERAL BUS AND CONFIGURABLE HOST BRIDGE, having an application Ser. No. 10/684,872; filed Oct. 14, 2003; now U.S. Pat. No. 7,096,305; which application is a continuation-in-part of and claims priority to U.S. Patent Application entitled ADDRESSING SCHEME SUPPORTING FIXED LOCAL ADDRESSING AND VARIABLE GLOBAL ADDRESSING, having an application Ser. No. 10/439,343; filed May 15, 2003; now U.S. Pat. No. 7,340,546; and in which both applications are hereby incorporated by reference in this application.

BACKGROUND OF THE INVENTION

1. Field of the Invention

This invention is related to peripheral bus interconnection of computing devices; and, more particularly, to peripheral bus switches.

2. Description of the Related Art

In many systems, multiple nodes are coupled together to form a processing system. Each node may comprise an integrated circuit, or multiple integrated circuits and/or other devices (e.g., input/output (I/O) devices and/or interfaces). Each node has a local address space used to address memory in the node or coupled to the node ("local memory"), as well as various I/O devices or interfaces in the node. Typically, the address spaces are relatively fixed (e.g., various regions within the address space are dedicated to local memory or I/O devices). There may be some amount of programmability to the address space (e.g., regions of the address space mapped to memory may be sized to permit varying amounts of local memory). The multiple nodes are typically interconnected via an I/O fabric, which services I/O communications between the multiple nodes.

The address space within each node of a multi-node system typically matches. That is, given the same amount of memory and the same I/O devices, the same numerical addresses in each local address space refer to the local memory or I/O devices in that node. Accordingly, sharing local memory or I/O devices with other nodes (permitting the other nodes to access and/or update the shared local memory or devices) is complicated. Because of the difficulty in sharing resources it is desirable for the interconnecting I/O fabric to not introduce additional complexities. Thus, systems of this type are typically structured in a "tree" so that transactions on the I/O fabric may be routed in a simple manner. A system having multiple nodes interconnected by an I/O fabric (referred to herein also as a "peripheral bus fabric") and a typical mechanism for interaction of the multiple nodes is shown in FIGS. 1A and 1B, respectively.

FIG. 1A illustrates a local address space 10 corresponding to a first node (node 0), a local address space 12 corresponding to a second node (node 1), and an I/O address space 14 corresponding to an I/O interface used to communicate between node 0 and node 1 across the peripheral bus fabric. Node 0 and node 1 represent host bridges and/or devices of the peripheral bus fabric. Address 0 is at the bottom of each address space in FIG. 1A. Each local address space 10 and 12 has a variety of regions, e.g., a local I/O region for the local I/O devices and interfaces in each node, a memory region for the local memory, and an external region that is mapped onto the I/O address space 14. While contiguous regions are shown in FIG. 1A for simplicity, multiple local I/O regions and/or memory regions may be defined in each local address space 10 and 12.

A shared memory location 16 in the node 1 local address space is also illustrated via the crosshatched box in the node 1 local address space 12. A shared I/O location (e.g., corresponding to a local I/O device or interface that is to be shared between the nodes) may be similar. The shared memory location 16 is addressed using an address A in the node 1 local address space 12. The address A cannot be used by node 0 to access the shared memory location 16, as the address A is in the memory region of the local address space 10 and refers to a local memory location 18 in the node 0. For node 0 to access the shared memory location 16, an address in the external region must be used (to cause a transaction on the I/O interface to communicate to node 1). Thus, for example, an address B in the external region at the local address space 10 may be assigned to the shared memory location 16. The address B is further mapped to an address C in the I/O address space 14, which is mapped to the address A in the local address space 12 by the node 1 in response to receiving the I/O transaction on the I/O interface.

In the illustrated mechanism, three different addresses (A, B, and C) are used to access the same shared memory location 16. If additional nodes (not shown) access the same memory location, even more addresses may be used. Such a scheme may create complexities for software executing on the system. For example, if a software process that accesses the shared memory location 16, and the process migrates from one node to another, the address used to access the shared memory location 16 must be recalculated. To perform the recalculation properly, the process must be "aware" of which node it is running on, which may complicate the process. Some currently existing software assumes that a given local address in the external region of the local address space is numerically equal to the corresponding I/O address in the I/O address space (although it clearly cannot be equal to the address in the other local address space if a shared memory location or I/O device is being accessed in another node). Such assumptions further complicate address space management. In nodes in which virtual address spaces are implemented (e.g., nodes having processors), some software may even attempt to make the virtual address the corresponding physical address in the local address space, and the corresponding I/O address numerically equal.

The illustrated mechanism also presents difficulties if cache coherency is to be maintained for the shared memory location. Typically, coherency schemes rely on comparing the addresses of transactions to the cached addresses in a given cache. However, if each node is using different addresses to access the same location, comparing the addresses is insufficient to detect an access to the same memory location as a cached memory location. Some multi-node cache coherent nonuniform memory access (CC-NUMA) systems use the most significant address bits as a node identifier identifying the node to which the address is mapped. Such systems typically include the interconnect between nodes to support a global address space that is shared by the nodes (e.g., the "local" address spaces are merely part of the global address space that is assigned to the node).

Because of the significant difficulties relating to address space translations when using an I/O fabric to support resource sharing, simplicity in the configuration and operation of the I/O fabric (peripheral bus fabric) is desirable. FIG. 1B illustrates a prior art peripheral bus fabric 150 having a tree structure, which is orderly and well known. A host bridge 9 configures the peripheral bus fabric, including bus_A, bus_B, bus_C, bus_D, and bus_E, and then configures a plurality of bridges 13a-13d and a plurality of devices 11a-11i for operation within the peripheral bus fabric. In these configuration operations, the host bridge 9 works in conjunction with the bridges 13a-13d and devices 11a-11i to program their Base Address Registers (BARs) and Address Range Registers (ARRs). The BARs and ARRs facilitate the routing of I/O transactions within the peripheral bus fabric by the host bridge 9, the bridges 13a-13d, and the plurality of devices 11a-11i. This configuration forms the I/O address space 14 of FIG. 1A. Because the BARs and ARRs are configured a single time, their programming is fixed and sets the routing of transactions within the peripheral bus fabric.

The tree structure of the peripheral bus fabric 150 requires each I/O transaction to take a pre-defined path within the I/O fabric. Should a bus of the I/O fabric become overloaded, the performance of the I/O fabric, and of the system itself, will suffer. Should one of the buses of the I/O fabric becomes corrupted due to the improper operation of a bridge, for example, the system becomes partially or fully non-functional. Should the host bridge become unavailable, the I/O fabric will fail. These problems become particularly onerous in a system in which a plurality of nodes shares resources.

Thus, it would be desirable to have a processing system supporting resource sharing among a plurality of nodes to have improved robustness, to support a simplified addressing scheme, and to provide flexibility in configuration.

BRIEF SUMMARY OF THE INVENTION

In order to overcome the above-described shortcomings, among others, a peripheral bus switch constructed according to one embodiment of the present invention includes a virtual peripheral bus, a plurality of bridges, and a configurable host bridge. A first bridge operably couples on a first side to the virtual peripheral bus and supports connection on a second side to a peripheral bus fabric. A second bridge operably couples on a first side to the virtual peripheral bus and supports connection on a second side to the peripheral bus fabric. The configurable host bridge operably couples to the virtual peripheral bus, supports a host mode of operation in which it serves as a host bridge, and supports a device mode of operation in which it operates as a device.

When operating in the host mode of operation the configurable host bridge configures devices of the peripheral bus fabric, the configurable host bridge serves as a root bridge of the peripheral bus fabric, and the virtual peripheral bus serves as a root bus of the peripheral bus fabric. When the configurable host bridge operates in the device mode of operation a root host bridge configures the peripheral bus fabric and the configurable host bridge appears to be a peripheral bus device. Further, with the configurable host bridge operating in the device mode of operation, the virtual peripheral bus appears to be a peripheral bus of the peripheral bus fabric. In one particular operation in the device mode, the virtual peripheral bus appears to the root host bridge to be a Peripheral Component Interconnect (PCI) bus, HT bus, PCI Express Bus, PCI-X bus, etc., of the peripheral bus fabric.

The virtual peripheral bus, the first bridge, the second bridge, and the configurable host bridge are emulated, in one embodiment, by a system on a chip having at least one processing unit, memory, an internal bus operably coupled to the at least one processing unit and the memory, a plurality of input ports operably coupled to the internal bus that receive peripheral bus transactions, and a plurality of output ports operably coupled to the internal bus that transmit peripheral bus transactions. With this construct, as well as other constructs, the configurable host bridge shares a memory space with at least one other host bridge coupled via the peripheral bus fabric. More generally, the physical addressing scheme used by the internal bus (as well as physical addressing schemes used by other processing devices coupled via the peripheral bus fabric) share an addressing space with the peripheral bus fabric. To support this common addressing space, at least a portion of the peripheral bus fabric supports at least one version of the HyperTransport (HT) specification, the PCI specification, the PCI-X specification, or the PCI Express specification. Further, the virtual peripheral bus may appear to support one or more versions of the PCI specification, the HT specification, the PCI-X specification, or the PCI Express specification, independent of the specification(s) supported by the peripheral bus fabric.

Other features and advantages of the present invention will become apparent from the following detailed description of the invention made with reference to the accompanying drawings.

BRIEF DESCRIPTION OF THE SEVERAL VIEWS OF THE DRAWINGS

FIG. 11 is a diagram illustrating a structure of a node routing table according to one embodiment of the present invention;

DETAILED DESCRIPTION OF THE INVENTION

Figure 2A:
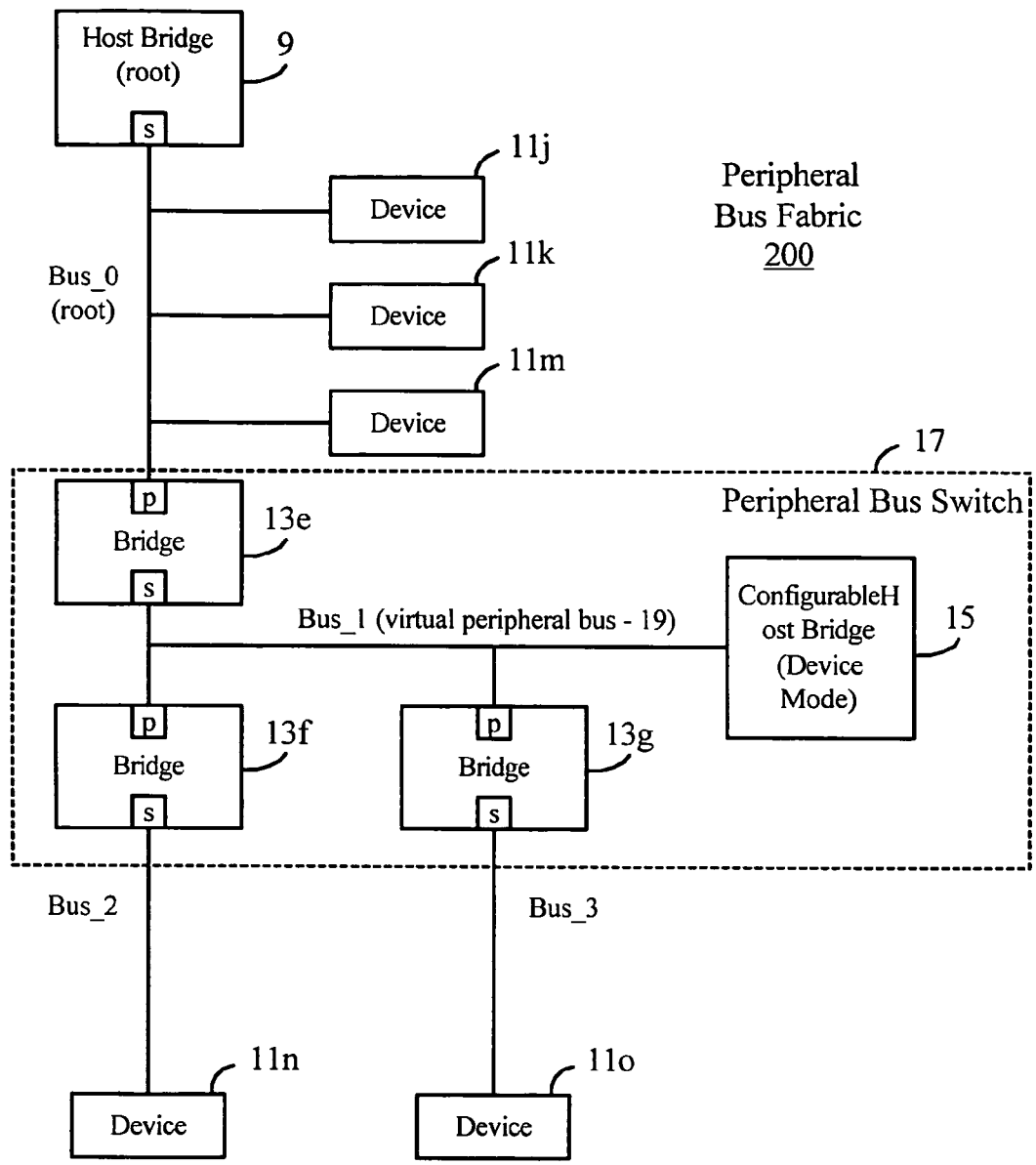
FIG. 2A is a block diagram illustrating a peripheral bus switch constructed according to one embodiment of the present invention and its interconnection within a peripheral bus fabric.

FIG. 2A is a block diagram illustrating a peripheral bus switch 17 constructed according to one embodiment of the present invention and its interconnection within a peripheral bus fabric 200. The peripheral bus fabric 200 services a host bridge 9, devices 11j, 11k, 11m, 11n, and 11o, and the peripheral bus switch 17. The peripheral bus switch 17 includes a virtual peripheral bus 19, a first bridge 13e, a second bridge 13f, a third bridge 13g, and a configurable host bridge 15. The first bridge 13e operably couples on a first side to the virtual peripheral bus 19 and supports connection on a second side to a peripheral bus fabric, in this instance bus_1 of the peripheral bus fabric 200. The second bridge 13f operably couples on a first side to the virtual peripheral bus 19 and supports connection on a second side to a peripheral bus fabric, in this instance bus_2 of the peripheral bus fabric 200. The third bridge 13g operably couples on a first side to the virtual peripheral bus 19 and supports connection on a second side to bus_3 of the peripheral bus fabric 200. The virtual peripheral 19 bus may appear to support one or more versions of the PCI specification, the HT specification, the PCI-X specification, or the PCI Express specification, independent of the specification(s) supported by the peripheral bus fabric.

The virtual peripheral bus 19 is configured as bus_1 by host bridge 9 during the host bridge's configuration of the peripheral bus fabric. Thus, bridge 13e, which bridges bus_0 to the virtual peripheral bus 19, has its primary port coupled to bus_0 and its secondary port coupled to the virtual peripheral bus 19 (bus_1). Configurable host bridge 15 operates in a device mode within the structure of FIG. 2A. In such case, during configuration, the configurable host bridge 15 presents itself as a device to the host bridge 9 and the host bridge 9 configures the configurable host bridge 15 for operation within the peripheral bus fabric 200. As will be further described with reference to FIG. 2B, the configurable host bridge also supports a host mode of operation in which it serves as a host bridge.

Bridge 13f bridges the virtual peripheral bus 19 (bus_1) to bus_2, has its primary port coupled to the virtual peripheral bus 19 and its secondary port coupled to bus_2. Likewise, Bridge 13g bridges the virtual peripheral bus 19 (bus_1) to bus_3, has its primary port coupled to the virtual peripheral bus 19 and its secondary port coupled to bus_3. Device 11n couples to bus_2 of the peripheral bus fabric 200 and Device 11o couples to bus_3 of the peripheral bus fabric. Likewise, device 11n couples to the secondary port of bridge 13f.

Figure 2B:
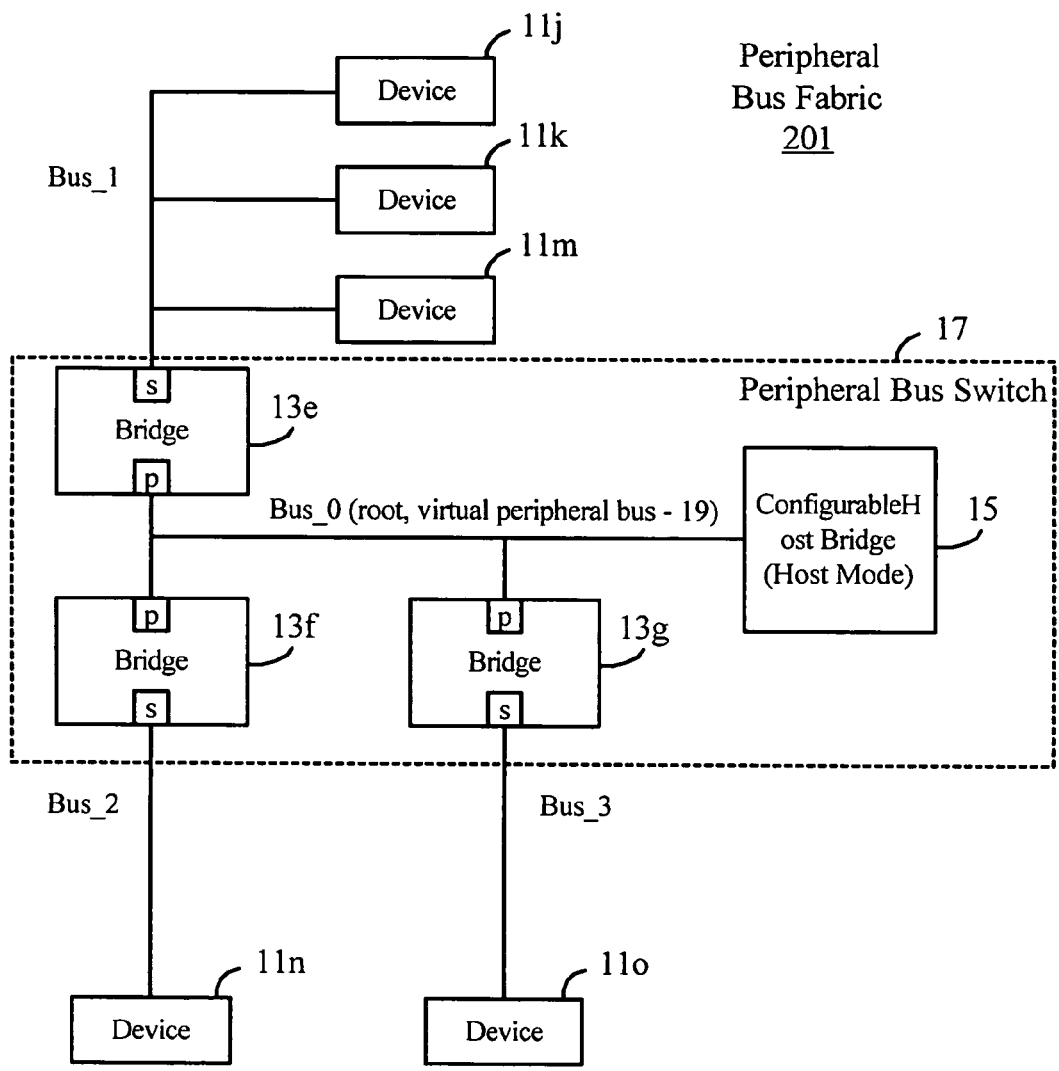
FIG. 2B is a block diagram illustrating a peripheral bus switch constructed according to another embodiment of the present invention and its interconnection within a peripheral bus fabric.

FIG. 2B is a block diagram illustrating a peripheral bus switch constructed according to another embodiment of the present invention and its interconnection within a peripheral bus fabric. In the structure of FIG. 2B, the peripheral bus switch 17 operates in a host mode of operation and configures the peripheral bus fabric 201. As contrasted to the structure of FIG. 2A, the configurable host bridge 15 configures the virtual peripheral bus 19 (internal to peripheral bus switch 17) to be the root bus (bus_0) of the peripheral bus fabric 201. A further difference is that the configurable host bridge 15 configures the bridges 13e, 13f, and 13g, to have their primary ports coupled to the virtual peripheral bus 19 and their secondary ports configured external to the peripheral bus switch 17. In the host mode of operation, the peripheral bus switch 17 also configures devices 11j-11o for peripheral bus fabric 201 interconnectivity. In the host mode of operation, the configurable host bridge 15 operates as the root host bridge of the peripheral bus fabric 201. However, as will be further described with reference to FIGS. 12A, 12B, and 13, the configurable host bridge 15 also supports double hosted chains in which two host bridges are supported.

In each of the structures of FIGS. 2A and 2B, the virtual peripheral bus 19 within the peripheral bus switch 17 does not necessarily have a distinct physical structure. Instead, as will be further described with reference to FIG. 3, a processing device (node 30) configured and constructed according to the present invention may emulate the virtual peripheral bus 19 without requiring an exact, physical structure. In either case, the virtual peripheral bus 19 appears to be an actual peripheral bus of the peripheral bus fabric 200 or 201 without a corresponding distinct structure. In one particular embodiment, the peripheral bus fabric 200 or 201 supports the HyperTransport™ (HT) specification. In such case, the virtual peripheral bus 19 may appear to be an HT bus, a Peripheral Component Interconnect (PCI) bus, a PCI-X bus, or a PCI Express bus. When the peripheral bus fabric 201 supports the HT standard and the virtual peripheral bus 19 supports the PCI standard, each of the bridges 13e, 13f, and 13g appears to be an HT-to-PCI bridge.

Figure 1A:
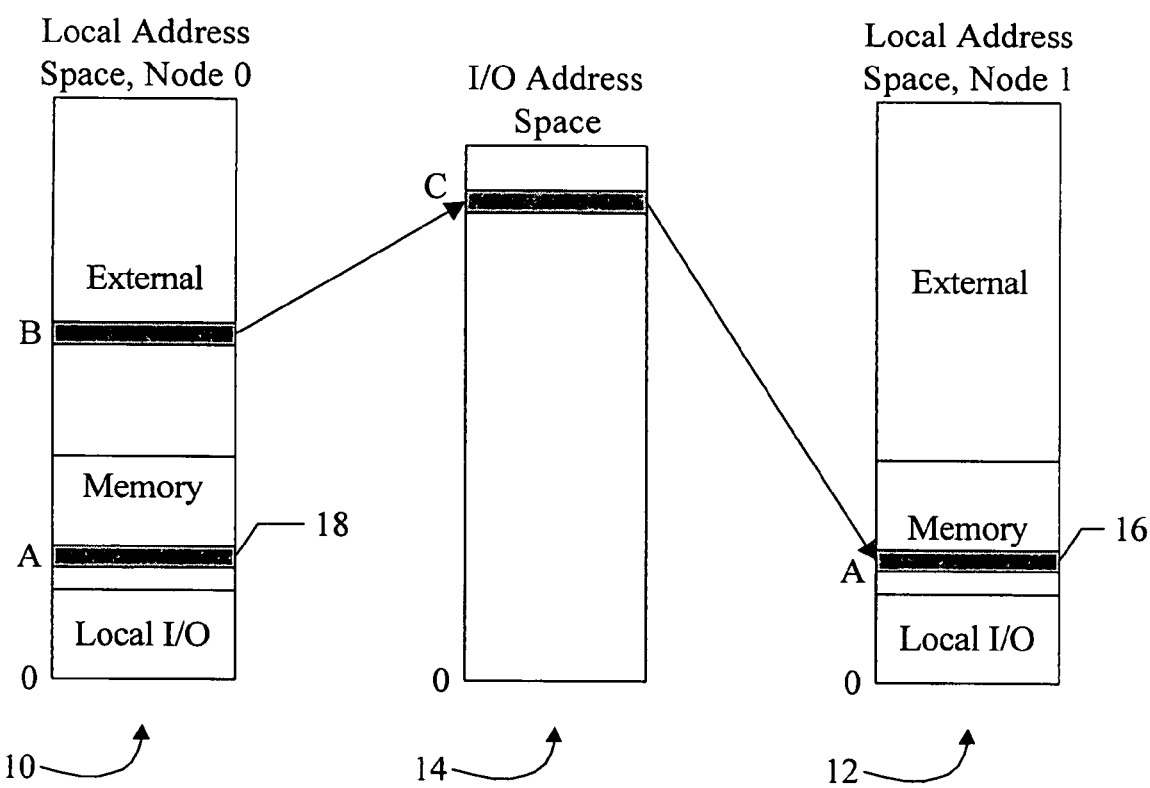
FIG. 1A is a block diagram of a prior art memory map.
Figure 1B:
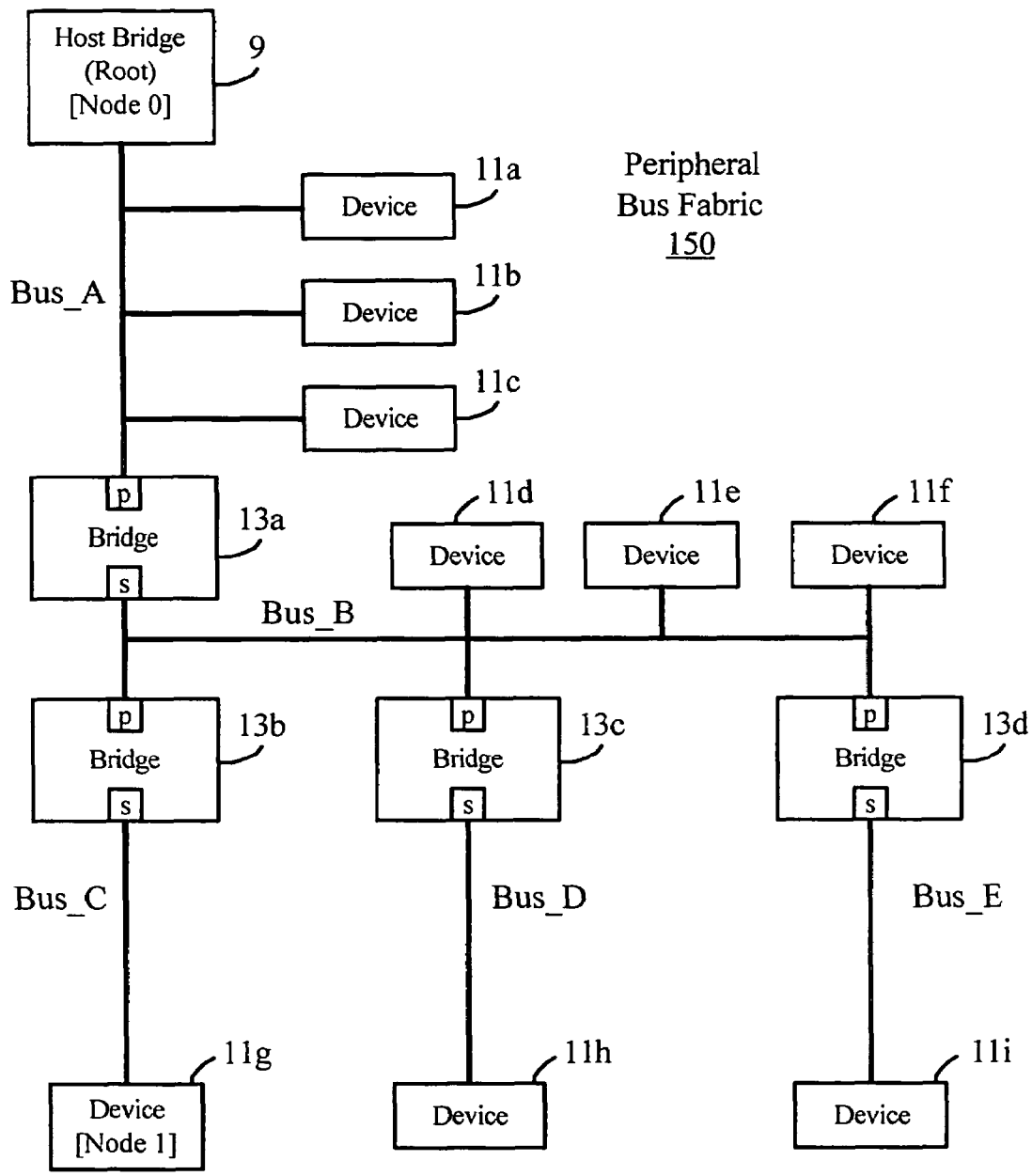
FIG. 1B is a block diagram of a prior art peripheral bus tree structure.
Figure 2C:
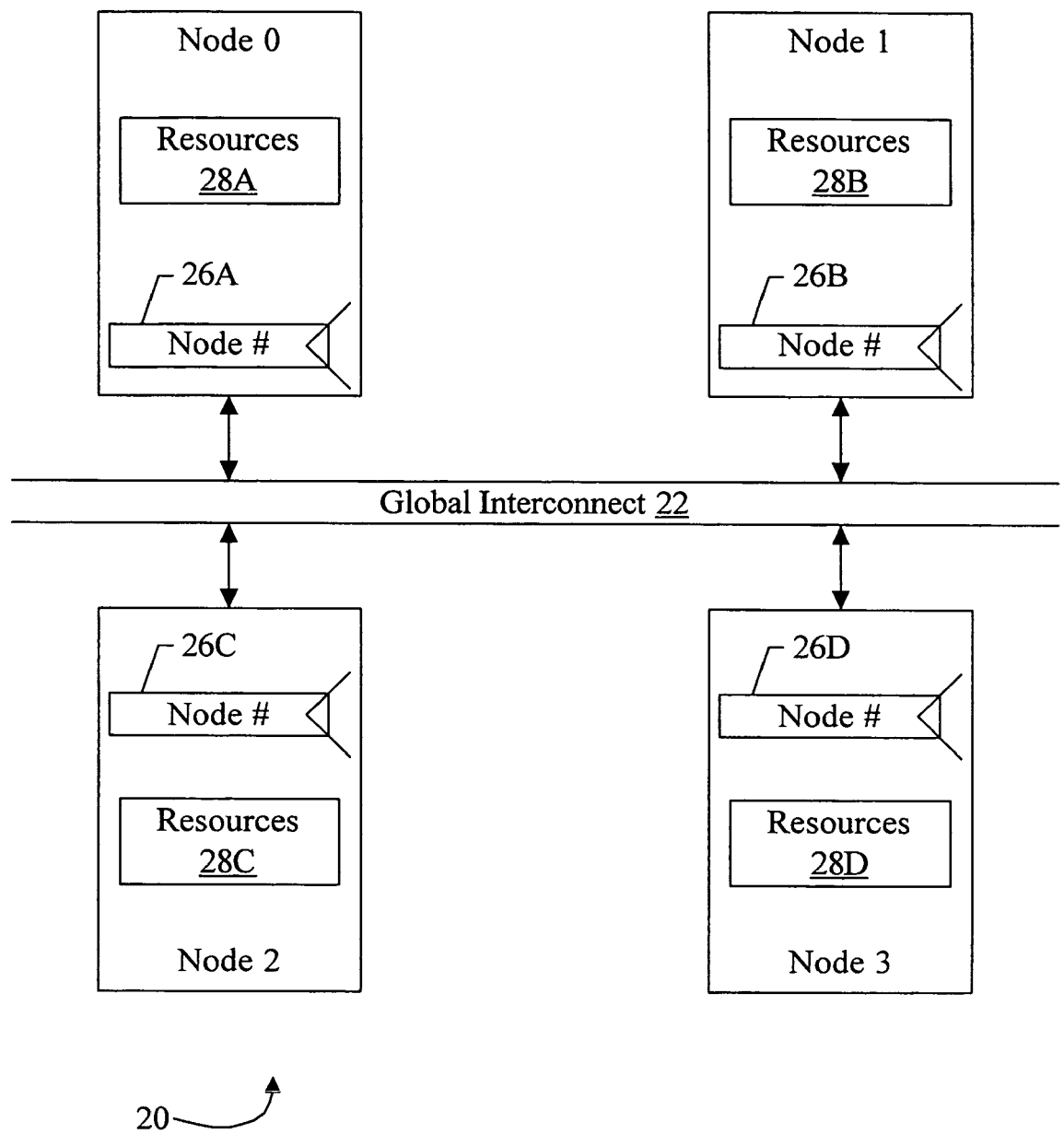
FIG. 2C is a block diagram illustrating one embodiment of a system including a plurality of nodes coupled to a global interconnect.

Turning now to FIG. 2C, a block diagram of one embodiment of a system 20 includes a plurality of nodes (node 0 through node 3) coupled via a global interconnect 22 (peripheral bus, in some embodiments). Each node includes a register (26A-26D, respectively) that stores a node number for the node and additional information. Each node may also include (or be coupled to) one or more resources (e.g., 28A-28D in FIG. 2C). The number of nodes in a given embodiment may vary, and may be more or fewer than the number of nodes shown here in FIG. 2C. Additionally, not all nodes may have local memory in some embodiments. Generally, the addressing scheme of FIG. 1A (or FIG. 7) may be employed with the bridges 9, 13e-13g, and/or 15 and/or devices 11j-11o of FIG. 2B. However, the addressing scheme illustrated in FIG. 11 may also be employed with these devices in lieu of the addressing scheme of FIG. 1A.

The nodes may each implement a local address space. The local address space may include a local region, and may include a plurality of alias regions. One of the alias regions may be aliased to the local region in a given node using the corresponding register 26A-26D. The local region may be used within each node to address the resources 28A-28D that are in that particular node. That is, the local region may be used within the node 0 to address the resources 28A in the node 0; the local region may be used within the node 1 to address the resources 28B in the node 1; etc. Thus, transactions initiated within a node and having addresses within the local region may complete within the node, without causing transactions on the global interconnect 22.

The registers 26A-26D each store a node number that identifies one of the plurality of alias regions to be aliased to the local region in that node. In use, each register 26A-26D may store a different node number so that different ones of the plurality of alias regions are aliased to the local region in different nodes. While a node number is used in the illustrated embodiment, generally any indication may be stored in each register 26A-26D to identify one of the plurality of alias regions.

The alias region for a given node may be used by other nodes, within their local address spaces, to address the resources 28A-28D in that node. That is, each alias region other than the alias region identified by a node's node number may be treated as external by that node. Since each node is programmed to use a different one of the plurality of alias regions as the alias to the local region in that node, any node may access resources in a given node by using the alias region assigned to that given node. For example, the node 0 may use addresses in the alias region indicated by the node number in the register 26B to access resources 28B in the node 1. The node 1 may use addresses in the alias region indicated by the node number in the register 26B, or addresses in the local region, to access the resources 28B. Similarly, the node 1 may use addresses in the alias region indicated by the node number in the register 26A to access resources 28A in the node 0. The node 0 may use addresses in the alias region defined by the node number in the register 26A, or the local region, to access the resources 28A. Accordingly, shared access to the resources 28A-28D among the nodes 0 through 3 may be provided via the alias regions.

In some embodiments, the alias region may be used to access memory coupled to a node or within a node (the "local memory") with internode coherency enforced. In other words, the local memory may be resources 28A-28D of the respective node 0 to node 3. Since the same numerical address (within the alias region assigned to the node) is used by any node to access a given memory location, internode coherency within the aliased region may be enforced by comparing the addresses of the transactions to cached addresses. In some implementations, intranode coherency may be enforced between accesses in the local region and corresponding accesses in the alias region. In other implementations, intranode coherency may not be enforced in these cases.

In some embodiments, the alias region may be used by other nodes to access local I/O devices or interfaces in the node. In other words, local I/O devices or interfaces in a node may be resources 28A-28D of the respective node 0 to node 3. A combination of local I/O devices/interfaces and local memory may be accessed using the alias region. Accordingly, the system 20 may provide a mechanism for software to access resources either privately by the node (i.e., no shared access by other nodes) or as shared resources among the nodes. Software may ensure that a given resource is private to its node by ensuring that the resource is addressed using its address in the local region. Software may provide shared access to a resource by using the address in the alias region for that node.

Since the local address spaces in each node match, with different alias regions used to provide access to resources in each node, the numerical value of the alias address used for a given resource in a given node may be the same irrespective of which node the transaction is initiated in (either the node having the resource, or another node). Thus, processes that may migrate from node to node may use the same address to access a given resource in a given node. Accordingly, recalculation of addresses for a process based on which node it is executing in may be avoided.

Each resource of the node is assigned an address or addresses in the local region of the address space. Corresponding addresses in the alias region for the node may also be used to address the resource. An address in the alias region may correspond to an address in the local region if the address in the alias region is at the same offset from the base of the alias region, as the address in the local region is from the base of the local region. In some embodiments, the node number in the registers 26A-26B defines the most significant bits of the alias region addresses. The local region may have the same set of most significant bits equal to zero. Remaining address bits for a given resource in either region may be equal. In other embodiments, the node number may define any set of bits within the address, and the remaining address bits for a given resource in either region may be equal.

Additionally, in some embodiments, the numerical value of the alias address may be made equal to the global address used on the global interconnect 22 (peripheral bus fabric 200 or 201). Generally, there may be mechanisms for exposing regions that are accessible via transactions on the global interconnect 22, and these regions may be programmed during initialization of the system 20. For example, in some embodiments, the global interconnect 22 may be compatible with the PCI specification, the HT specification, the PCI-X specification, or the PCI Express specification. These specifications use special configuration commands to access configuration header data structures for each device on the interface. The configuration header stores information identifying the device, its functions, etc. The size of an address range used to address the device may also be identified. The beginning of the address range may be programmable in a base address register (BAR), thus permitting a region of the global address space to be assigned to the device. A given device may have multiple address ranges assigned in this manner. Thus, for example, a node may have an address range corresponding to each relocatable region, and the BAR for the region may be programmed during initialization. Nodes may have additional address ranges/BARs for other purposes as well. In other embodiments, the numerical value of the global address may differ from the numerical value of the corresponding local addresses.

As used herein, a "node" may comprise any set of one or more integrated circuits, I/O devices or interfaces, and other circuitry, which are arranged together and interact using a local address space. An "address space" may comprise a set of addresses, which are used to communicate between various components. Addresses within an address space are generally differentiated from each other. Addresses in different address spaces may not necessarily have any relationship to each other. An "alias" may be a first address in an address space, which is used to refer to the same resource as a second address within the same address space. A "region" of an address space comprises a contiguous range of addresses within the address space. An "alias region" may be a contiguous range of addresses which are aliased to addresses within another region of the same address space. A node may have one or more resources that are addressable via addresses in the address space. As used herein, the term "resource" may generally refer to any device or circuitry that may be used to provide a function. The term resource may include the local memory (e.g., the memory for node 0) and/or I/O devices or interfaces in the node. The memory may provide a storage function, and the I/O devices or interfaces may provide any desired peripheral function.

The global interconnect 22 may be any form of communication medium between the nodes. For example, in various embodiments, the global interconnect 22 may include shared buses, crossbar connections, point-to-point connections in a ring, star, daisy-chain, or any other topology, meshes, cubes, etc. The global interconnect 22 may also include storage in some embodiments. In one particular implementation, the global interconnect 22 may comprise point-to-point connections for packet-based communication as defined in the HT specification. In another implementation, the global interconnect 22 may comprise a shared bus compatible with the PCI specification. Other implementations may use other industry-standard I/O interconnects or a custom-designed interconnect, as desired. A transaction transmitted on the interconnect may include a communication sourced by one of the nodes on the interconnect and targeting at least one other node on the interconnect. Some transactions may target more than one node (e.g., a broadcast or multicast transaction). The transaction includes an address, and may include a transfer of data (e.g., a read or write transaction). If a coherency scheme (e.g., CC-NUMA) is implemented for internode coherency, transactions may also include transactions to maintain coherency (e.g., probe commands, acknowledgements of the probe commands, data transfers, etc.)

Figure 3:
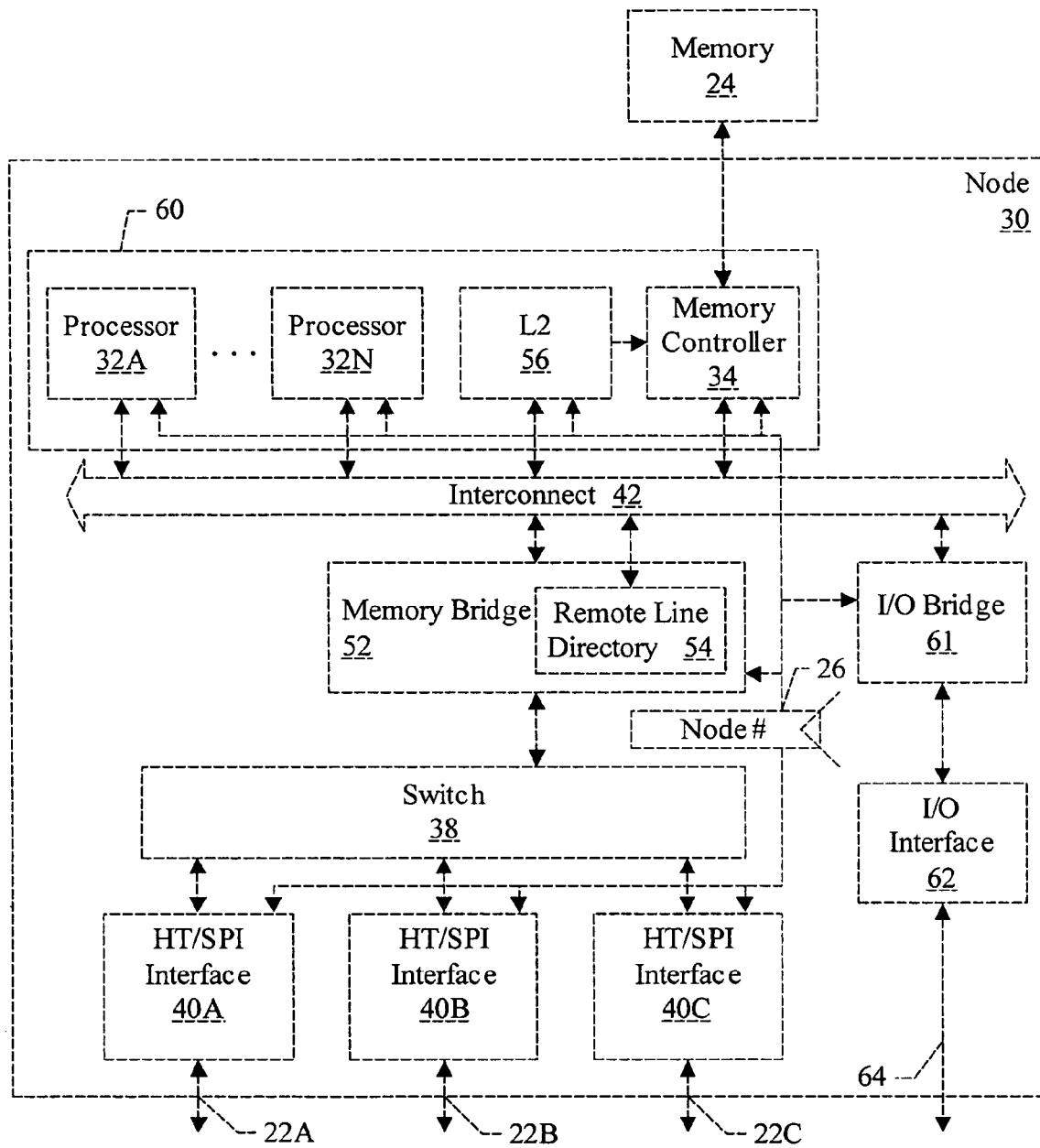
FIG. 3 is a block diagram of one embodiment of a node shown in FIG. 2C.

Turning now to FIG. 3, a block diagram of one embodiment of a node 30 is shown. In the embodiment of FIG. 3, the node 30 includes one or more processors 32A-32N, a memory controller 34, a switch 38, a set of interface circuits 40A-40C, a memory bridge 52, an L2 cache 56, an input/output (I/O) bridge 61, and an I/O interface circuit 62. The memory bridge 52 includes a remote line directory 54. The node 30 includes an interconnect 42 (system bus in some embodiments) to which the processors 32A-32N, the memory controller 34, the L2 cache 56, the memory bridge 52, the remote line directory 54, and the I/O bridge 61 are coupled. The node 30 is coupled, through the memory controller 34, to a memory 24. The node 30 is coupled to a set of interfaces 22A-22C through respective interface circuits 40A-40C. The interfaces 22A-22C may form part of the global interconnect 22 shown in FIG. 2C. The interface circuits 40A-40C are coupled to the switch 38, which is further coupled to the memory bridge 52. A configuration register 26 is also illustrated in FIG. 3, which stores a node number (Node #) for the node 30. The configuration register 26 may be any of the configuration registers 26A-26D in FIG. 2C. The configuration register 26 is coupled to the L2 cache 56, the memory controller 34, the memory bridge 52, and the interface circuits 40A-40C in the embodiment of FIG. 3. The processors 32A-32N may also be coupled to receive the node number from the configuration register 26. The I/O bridge 61 is coupled to the I/O interface circuit 62, which couples to an I/O interface 64, to the configuration register 26 and to other components of the node 30.

As mentioned above, the memory 24 and/or various local I/O interface circuits or devices, such as I/O interface circuit 62, may be examples of resources 28A-28D for this embodiment. Various circuitry in FIG. 3 may receive the node number from the configuration register 26 for handling the alias region of the node 30. For example, the memory controller 34 may receive the node number for detecting that a transaction is in the alias region for the node 30, and thus that the memory controller 34 may respond to the transaction if the address is in a portion of the region that is mapped to memory. Additionally, the memory controller 34 may respond to the portion of the local region that is mapped to memory. Similarly, the I/O bridge 61 may receive the node number to detect transactions (initiated by the memory bridge 52 in response to transactions received from the interface circuits 40A-40C or by an agent within the node 30) that are in the alias region for the node 30 and which correspond to a local I/O device/interface circuit, to bridge the transactions to the local I/O device/interface circuit for response by the local device/interface circuit. The I/O bridge 61 may also detect transactions in the local region, which correspond to a local I/O device/interface circuit, and may bridge the transactions to the local I/O device/interface circuit for response by the local I/O device/interface circuit. The L2 cache 56 may receive the node number for detecting the alias region (and also for caching remote blocks which are being fetched into the node 30, in one embodiment). The memory bridge 52 may receive the node number for detecting the alias region for which the node 30 is the home node (as opposed to another node 30 being the home node, in which case the memory bridge 52 may generate a coherent or noncoherent global transaction to the home node for the alias region).

In a system such as system 20 of FIG. 2C, internode coherency may be maintained via coherency commands transmitted to the node 30 and by the node 30 on one or more of the interfaces 22A-22C (via the interface circuits 40A-40C, respectively). The coherency commands may be transactions on the global interconnect 22, but may be referred to herein as coherency commands to more easily distinguish them in the text from transactions on the interconnect 42. As used herein, a memory bridge includes circuitry designed to handle internode coherency functions within a node. Thus, the memory bridge 52 may be a source/destination of the coherency commands from the global interconnect 22. In response to at least some received coherency commands, the memory bridge 52 may generate corresponding transactions on the interconnect 42. In response to at least some transactions on the interconnect 42 generated by other agents, the memory bridge 52 may generate coherency commands (e.g., if the address of the transaction is in an alias region for any of the nodes in the system 20).

The switch 38 may transfer coherent traffic from the interface circuits 40A-40C to the memory bridge 52. In one embodiment, the switch 38 may generally select sources and destinations to be coupled for communication based on requests from the sources to transmit data and requests from the destinations for data. For example, the interface circuits 40A-40C may identify coherency commands received on the interfaces 22A-22C, respectively, and may request transfer to the memory bridge 52. If the memory bridge 52 has indicated the ability to receive data of the corresponding type, the switch 38 may grant a transfer between a requesting interface circuit 40A-40C and the memory bridge 52. Similarly, memory bridge 52 may request a transfer to an interface circuit 40A-40C. If an interface circuit 40A-40C has indicated the ability to receive data of the corresponding type, the switch 38 may grant a transfer between the requesting memory bridge 52 and an interface circuit 40A-40C. Further, the switch 38 services transfers among and between the interface circuits 40A-40C.

Each of the interfaces 22A-22C used for coherent communications are defined to be capable of transmitting and receiving coherency commands. Particularly, in the embodiment of FIG. 3, interfaces 22A-22C may be defined to receive/transmit coherency commands to and from the node 30 from other nodes. Additionally, other types of commands may be carried. In one embodiment, each interface 22A-22C that is used to carry coherency commands may be an HT interface, including an extension to the HT interface to include coherency commands (HTcc). Additionally, in some embodiments, an extension to the HT interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc.

The node 30 may support intranode coherency for transactions on the interconnect 42 (e.g., via snooping). Additionally, the node 30 may support internode coherency with other nodes (e.g., a CC-NUMA coherency, in one embodiment). For example, in one embodiment, if a transaction on the interconnect 42 (e.g., a transaction issued by the processors 32A-32N) accesses a cache block that is remote to the node 30 (i.e., the cache block is part of the memory coupled to a different node) and the node 30 does not have sufficient ownership to perform the transaction, the memory bridge 52 may issue one or more coherency commands to the other nodes to obtain the ownership (and a copy of the cache block, in some cases). Similarly, if the transaction accesses a local cache block but one or more other nodes have a copy of the cache block, the memory bridge 52 may issue coherency commands to the other nodes. Still further, the memory bridge 52 may receive coherency commands from other nodes, and may perform transactions on the interconnect 42 to effect the coherency commands.

In one embodiment, a node such as node 30 may have memory coupled thereto (e.g., memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 52 in the remote node, for example, may detect a transaction on the interconnect 42 that accesses the cache block and may detect that the remote node does not have sufficient ownership of the cache block to complete the transaction (e.g., it may not have a copy of the cache block at all, or may have a shared copy and may require exclusive ownership to complete the transaction). The memory bridge 52 in the remote node may generate and transmit the coherency command to the home node to obtain the copy or to obtain sufficient ownership. The memory bridge 52 in the home node may determine if any state changes in other nodes are to be performed to grant the requested ownership to the remote node, and may transmit coherency commands (e.g., probe commands) to effect the state changes. The memory bridge 52 in each node receiving the probe commands may effect the state changes and respond to the probe commands. Once the responses have been received, the memory bridge 52 in the home node may respond to the remote node (e.g., with a fill command including the cache block).

The remote line directory 54 may be used in the home node to track the state of the local cache blocks in the remote nodes. The remote line directory 54 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain the modified state for the cache block. In the invalid state, the node may not read or write the cache block (i.e., the node does not have a valid copy of the cache block). Other embodiments may use other coherency protocols (e.g., the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

A node 30 may include one or more coherent agents (as shown in the dotted enclosure 60 in FIG. 3). In the embodiment of FIG. 3, the processors 32A-32N, the L2 cache 56, and the memory controller 34 may be examples of coherent agents 60. The I/O bridge 61 may also be a coherent agent. The memory bridge 52 may be a coherent agent (on behalf of other nodes). Generally, an agent includes any circuit which participates in transactions on an interconnect, e.g., peripheral bus fabric. A coherent agent is an agent that is capable of performing coherent transactions and/or operating in a coherent fashion with regard to transactions. A transaction is a communication on an interconnect, e.g., peripheral bus transaction. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments. As will be described further with reference to FIGS. 10-13, for purposes of describing other aspects of embodiments of the present invention, peripheral bus transactions may be categorized generally as input/output transactions, cache coherency transactions, and packet data transactions. The manner in which nodes process these types of peripheral bus transactions differs within the device. According to the embodiment of FIG. 2C, these differing types of transactions may also be routed on the peripheral bus fabric in a consistent manner. However, with the embodiments of FIGS. 10-13, the nodes may route differently these different types of transactions.

In one embodiment, the remote line directory 54 may be configured to track a subset of the local memory space that may be coherently shared with other nodes. That is, the remote line directory 54 may be configured to track up to a maximum number of cache blocks, where the maximum number is less than the total number of cache blocks that may be coherently shared. In another embodiment, the maximum number may be less than the total number of remote cache entries. The remote line directory may have any structure (e.g., cache-like structures such as direct-mapped, fully associative, set associative, etc.). In one embodiment, the remote line directory 54 may be 16 k entries arranged in an 8 way set associative structure. If a cache block is being accessed by a remote node, and the remote line directory 54 in the home node detects a miss for the cache block, an entry is allocated to track the cache block. If the allocated entry is currently allocated to track a second cache block, the memory bridge 52 in the home node may generate probes to evict the second cache block from the other nodes (and possibly write back modified data to the home node, if applicable).

In one implementation, the L2 cache 56 in a remote node is designated to retain the node state for modified remote cache blocks. If the L2 cache 56 evicts a modified remote cache block, the L2 cache 56 may cause the remote block to be evicted from the node as a whole. It is noted that, in some embodiments, a coherency command may be received by an interface circuit 40A-40C that is passing through the node 30 to another node, and does not require processing in the node 30. The interface circuits 40A-40C may be configured to detect such commands and retransmit them (through another interface circuit 40A-40C via the switch 38) without involving the memory bridge 52.

The processors 32A-32N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The node 30 may include any number of processors (e.g., as few as one processor, two processors, four processors, etc.).

The L2 cache 56 may be any type and capacity of cache memory, employing any organization (e.g., set associative, direct mapped, fully associative, etc.). In one embodiment, the L2 cache 56 may be an 8 way, set associative, 1 MB cache. The L2 cache 56 is referred to as L2 herein because the processors 32A-32N may include internal (L1) caches. In other embodiments the L2 cache 56 may be an L1 cache, an L3 cache, or any other level as desired.

The memory controller 34 is configured to access the memory 24 in response to read and write transactions received on the interconnect 42. The memory controller 34 may receive a hit signal from the L2 cache 56, and if a hit is detected in the L2 cache for a given read/write transaction, the memory controller 34 may not respond to that transaction. The memory controller 34 may be designed to access any of a variety of types of memory. For example, the memory controller 34 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above-mentioned memory devices.

The I/O bridge 61 may bridge communications from one or more local I/O interfaces and/or devices to the interconnect 42. The I/O bridge 61 may initiate transactions on the interconnect 42 in response to communications from the I/O interface circuit 62 (in response to communications on the I/O interface 64), and may receive transactions from the interconnect 42 on behalf of the I/O interface circuit 62. One or more I/O interface circuits 62 may be coupled to an I/O bridge 61, and one or more I/O bridges 61 may be included. Any I/O interface 64 may be bridged in this manner (e.g., PCI, serial or parallel interfaces, PCMCIA interfaces, etc.). In one particular embodiment, the I/O interface circuit 62 may be an Ethernet Media Access Controller (MAC) interface and the I/O interface 64 may be an MII or GMII interface.

The interconnect 42 may be any form of communication medium between the devices coupled to the interconnect 42. For example, in various embodiments, the interconnect 42 may include shared buses, crossbar connections, point-to-point connections in a ring, star, or any other topology, meshes, cubes, etc. The interconnect 42 may also include storage, in some embodiments. In one particular embodiment, the interconnect 42 may comprise a bus. The bus may be a split transaction bus, in one embodiment (i.e., having separate address and data phases). The data phases of various transactions on the bus may proceed out of order with the address phases. The bus may also support coherency and thus may include a response phase to transmit coherency response information. The bus may employ a distributed arbitration scheme, in one embodiment. In another embodiment, the bus may be pipelined. The bus may employ any suitable signaling technique. For example, in one embodiment, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the node 30 may include additional circuitry, not shown in FIG. 3. For example, the node 30 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 42 or may be coupled through one or more I/O bridge circuits.

In one embodiment, the node 30 (and more particularly the processors 32A-32N, the memory controller 34, the L2 cache 56, the interface circuits 40A-40C, the memory bridge 52 including the remote line directory 54, the switch 38, the configuration register 26, and the interconnect 42) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 40A-40C are illustrated in FIG. 3, one or more interface circuits may be implemented in various embodiments. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

It is further noted that, while the cache block may be referred to as the granularity on which coherency is maintained, other embodiments may use different granularities greater than or less than a cache block in size. In such embodiments, a "coherency block" may be treated in the same fashion as a "cache block" or "block" when discussing coherency. Generally, a "coherency block" may include a set of contiguous (in memory) bytes which are treated as a unit for coherency purposes. In various embodiments, a coherency block may comprise a portion of a cache block, a single cache block, or multiple cache blocks, as desired.

The node 30 may be programmed/operated to implement the peripheral bus switch 17 of FIGS. 2A and 2B, which includes the virtual peripheral bus 19, the first bridge 13*e*, the second bridge 13*f*, the third bridge 13*g*, and the configurable host bridge 15. When the node 30 is configured to implement the peripheral bus switch 17, the components of the peripheral bus switch are emulated by the node 30. In particular, the interfaces 40*a*-40*c* implement a portion of the bridges 13*e*-

13g, respectively, with additional of the node 30 components implementing the remainder of the bridges' 13e-13g functionality. The virtual peripheral bus 19 has no exact corresponding counterpart within the node 30. Thus, the virtual peripheral bus 19 is emulated by the components of the node 30 in some embodiments. The configurable host bridge 17 is also emulated by the components of the node 30 in some embodiments. In such case, the configurable host bridge 17 and the virtual peripheral bus 19 are emulated by at least some of the node 30 components, including the switch 38, the memory bridge 52, the interconnect 42, the processors 32A-32N, the L2 cache 56, the memory controller 34, and/or the memory 24. In other embodiments, other components may also be employed to emulate the configurable host bridge 17 and the virtual peripheral bus 19. In still further embodiments a node may include physical structure for the virtual peripheral bus 19, the configurable host bridge 15, and/or the bridges 13e-13g.

Figure 4:
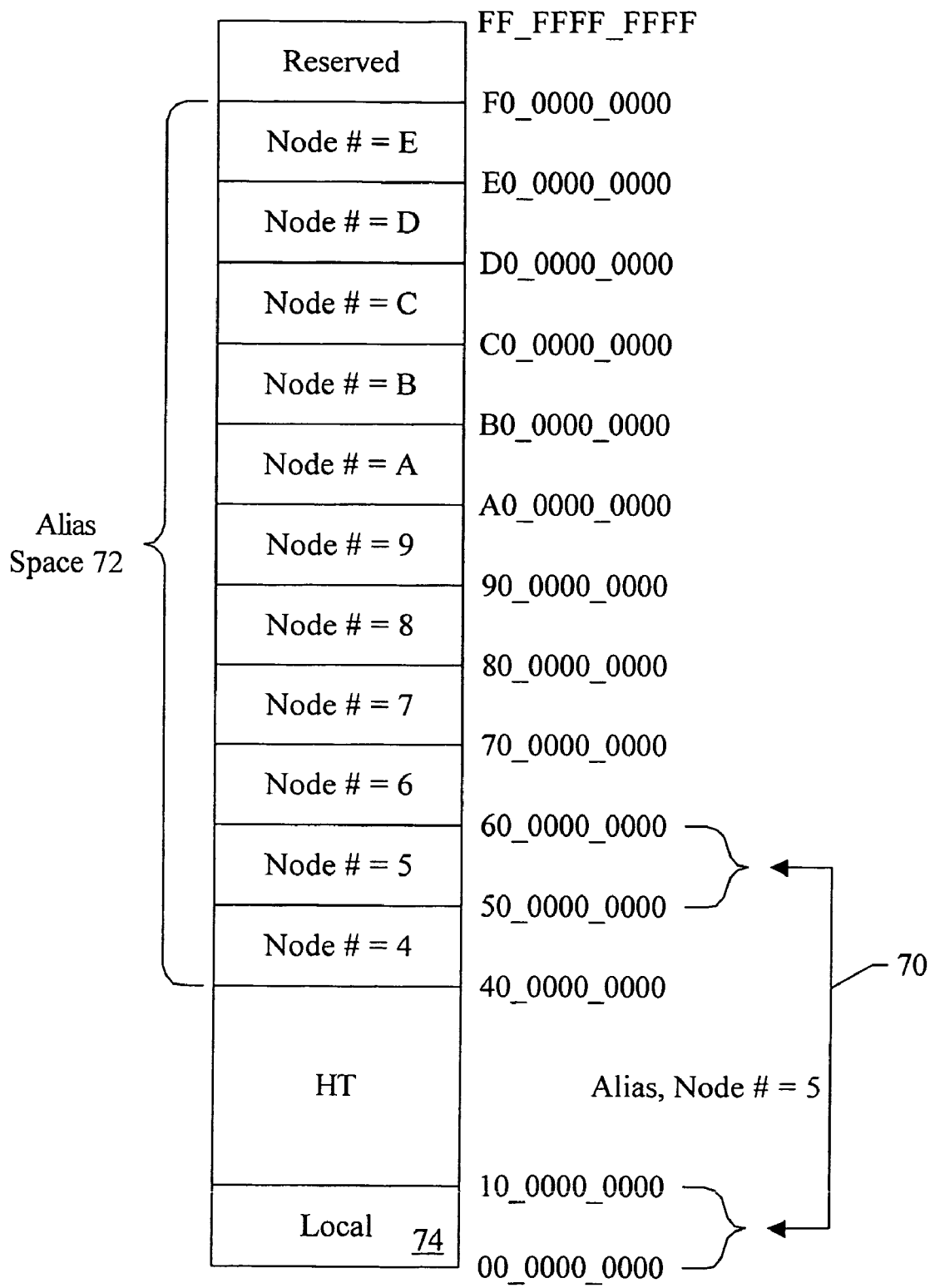
FIG. 4 is a block diagram illustrating one embodiment of an address space.

Turning next to FIG. 4, a block diagram illustrating one embodiment of an address space implemented by one embodiment of the node 30 is shown. Addresses shown in FIG. 4 are illustrated as hexadecimal digits, with an underscore bar ("_") separating groups of four digits. Thus, in the embodiment illustrated in FIG. 4, 40 bits of address are supported. In other embodiments, more or fewer address bits may be supported.

In the embodiment of FIG. 4, the address space between 00_0000_0000 and 0F_FFFF_FFFF is treated as the local region 74. Transactions generated by agents in the local region do not generate coherency commands or other global transactions to other nodes, although coherency may be enforced within the node 30 for these addresses. That is, the local region is not maintained coherent with other nodes. Various portions of the local region may be memory mapped to I/O devices, HT, etc., as desired.

The portion of the address space between 40_0000_0000 and F0_0000_0000 is the alias space 72. That is, the address space between 40_0000_0000 and F0_0000_0000 can be maintained coherent between the nodes for memory accesses via the coupling global interconnect 22 (peripheral bus fabric 200 or 201). Additionally, local I/O devices/interface circuits mapped to addresses in the local region 74 may be shared with other nodes through the alias region 72, even though coherency may not be maintained for I/O device/interface accesses. Each node is assigned one of a plurality of regions of the alias space 72. As shown in FIG. 2C, each node is programmable with a node number. In this embodiment, the node number is equal to the most significant nibble (4 bits) of the alias region assigned by that node number. Other embodiments may use more or fewer most significant bits to identify each alias region in the alias space 72. Thus, the node numbers may range from 4 to E in the embodiment shown. Other embodiments may support more or fewer node numbers, as desired. In the illustrated embodiment, each node is assigned a 64 Gigabyte (GB) portion of the address space as its alias region. The size of the alias region assigned to each node may be varied in other embodiments (e.g., based on the address size or other factors).

An example of alias region assignment for the node having node number 5 is shown in FIG. 4 via arrow 70. For such a node, the alias region 50_0000_0000 through 60_0000_0000 is aliased to 00_0000_0000 through 10_0000_0000, respectively. That is, after excluding the most significant bits that correspond to the node number in the alias regions from the local address and the corresponding alias address (where the corresponding alias address is the alias address that refers to the same resource as the local address within the node 30), the remaining portions of the local address and the corresponding alias address are numerically equal. Internode coherent accesses to the memory 24 or accesses from another node to a local I/O device/interface use the alias region (e.g. 50_0000_0000 to 60_0000_0000, in this example). That is, agents in other nodes and agents within the node that are coherently accessing cache blocks in the memory use the alias region. Private (non-coherent with other nodes) accesses to memory or local I/O devices use the local region 74.

The address space between 10_0000_0000 and 40_0000_0000 may be used for additional HT transactions (e.g., standard HT transactions) in the illustrated embodiment. Additionally, the address space between F0_0000_0000 and FF_FFFF_FFFF may be reserved in the illustrated embodiment.

Figure 5:
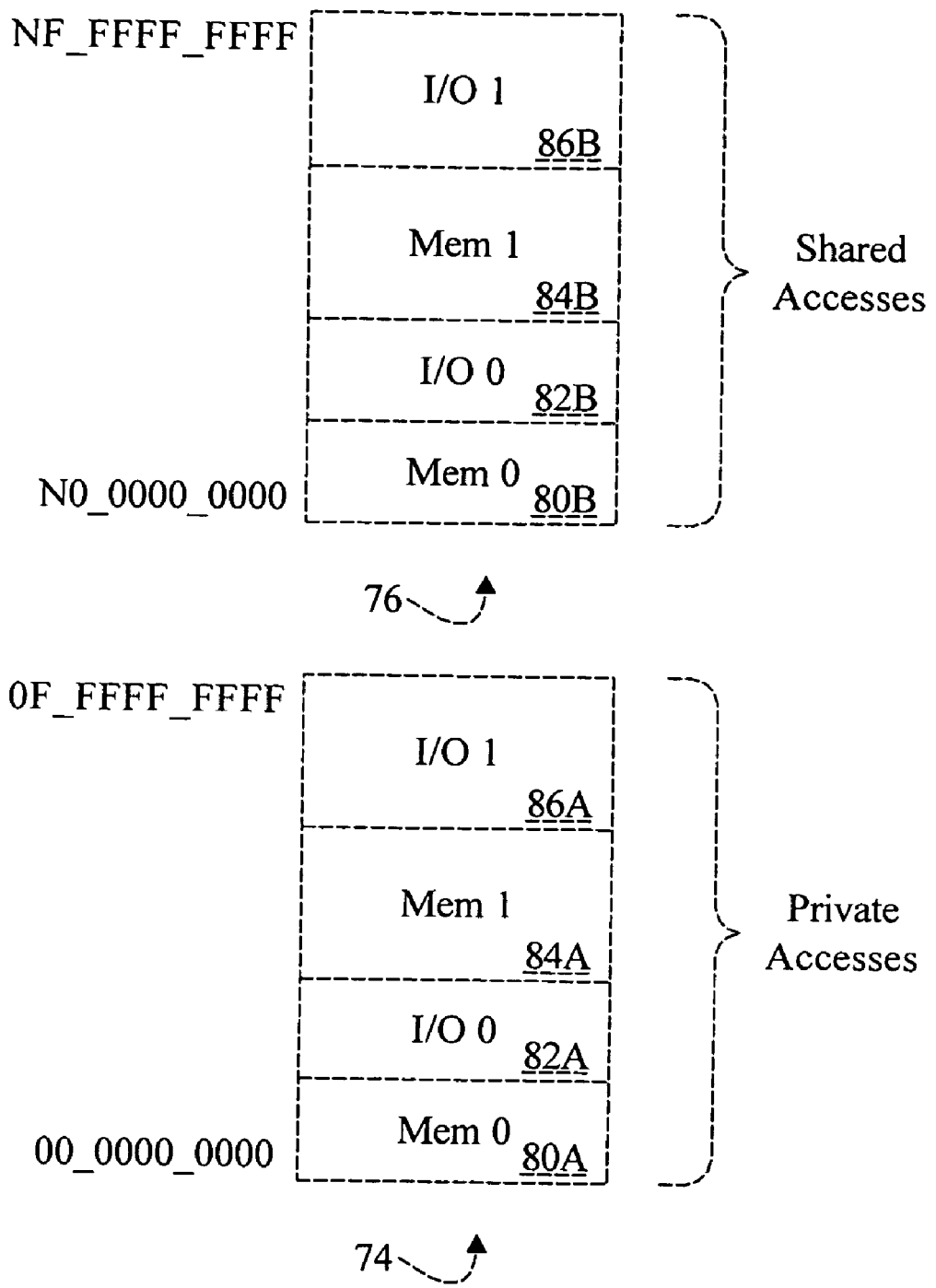
FIG. 5 is a block diagram of one embodiment of a local address region and an aliased address region.

Turning now to FIG. 5, a block diagram illustrating one embodiment of the local region 74 and an alias region 76 aliased to the local region 74 is shown. In the illustrated embodiment, the local region 74 includes the address range 00_0000_0000 to 0F_FFFF_FFFF, and includes a first memory portion 80A, a first I/O portion 82A, a second memory portion 84A, and a second I/O portion 86A. Any number of memory and/or I/O portions may be included in various embodiments. The memory portions 80A and 84A may be mapped to the memory 24 of FIG. 3, and the I/O portions 82A and 86A may be mapped to various local I/O interfaces/devices.

The alias region 76 may include the address range N0_0000_0000 to NF_FFFF_FFFF (where N is the node number of the node) and includes portions corresponding to the portions 80A, 82A, 84A, and 86A (labeled 80B, 82B, 84B, and 86B, respectively). Each corresponding portion 80B, 82B, 84B, and 86B aliases to the respective portion 80A, 82A, 84A, and 86A. That is, each corresponding portion 80B, 82B, 84B, and 86B occupies the same subrange of addresses within the alias region 76 as the respective portion 80A, 82A, 84A, and 86A occupies within the local region 74.

As mentioned above, the alias regions and the local region in the address space implemented by the nodes may permit software to access some resources of a node privately (by addressing such resources in the local region) and other resources of the node in a shared fashion between nodes (by addressing such resources in the alias region for the node).

Figure 6:
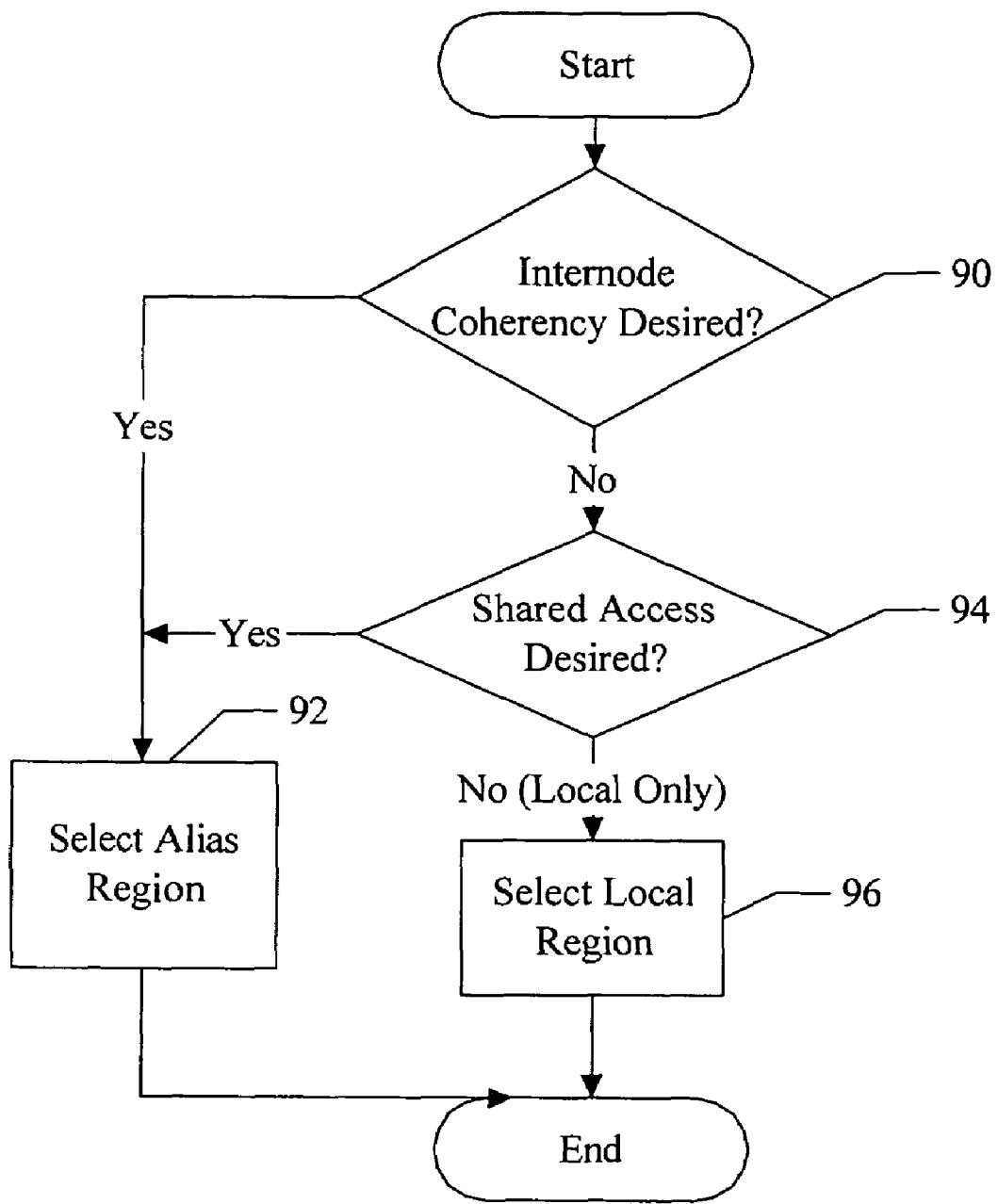
FIG. 6 is a flowchart illustrating a method of using the aliased address spaces.

FIG. 6 is a flowchart illustrating one embodiment of selecting which region to use to address a particular resource. While the blocks are shown in a particular order for ease of understanding, any order may be used. Particularly, the decision blocks 90 and 94 may be independent and may be performed in either order.

A determination may be made as to whether internode coherency is desired for the resource (decision block 90). Decision block 90 may be particularly applicable to memory resources, in one embodiment. If internode coherent is desired (decision block 90—"yes" leg), the alias region may be selected for addressing the resource (block 92).

A determination may be made if shared access for one or more nodes is desired for this resource (decision block 94). Decision block 94 may be particularly applicable to local I/O devices/interfaces, in one embodiment. Decision block 94 may also be applicable to non-coherent memory, in some embodiments. If shared access is desired (decision block 94—"yes" leg), the alias region may be selected for addressing the resource (block 92). Otherwise, the local region may be selected for addressing the resource (block 96).

Figure 7:
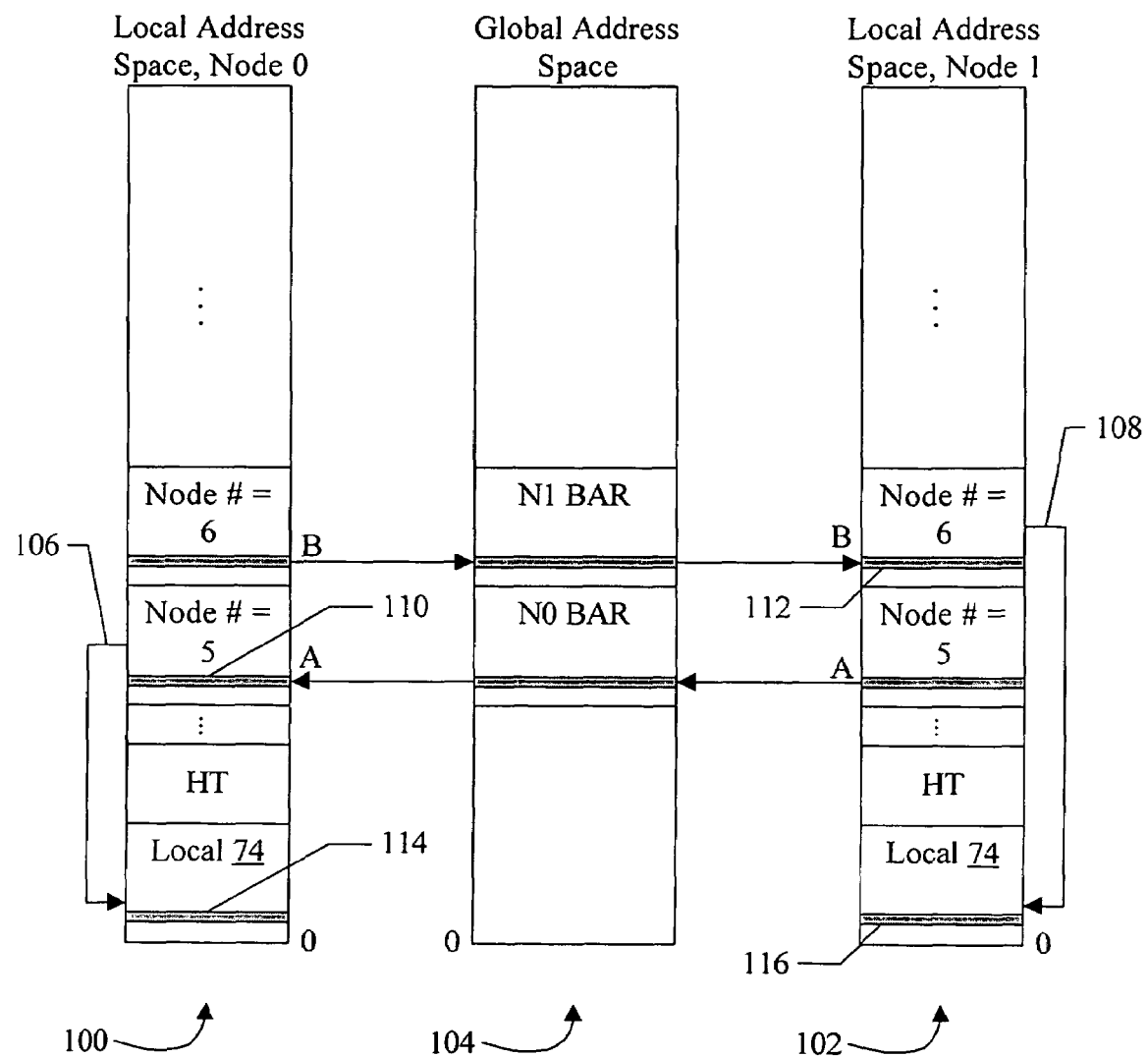
FIG. 7 is a block diagram of a one embodiment of mapping addresses in local and global address spaces.

FIG. 7 is a block diagram illustrating one embodiment of the local address spaces for nodes 0 and 1 (reference numerals 100 and 102, respectively) and a global address space 104 corresponding to the global interconnect 22 of FIG. 2C. Similar to FIG. 1A, address 0 in each address space is shown at the bottom of each address space.

In the illustrated embodiment, node 0 is programmed with node number 5 in its configuration register 26A (not labeled), and thus uses the alias region for node number 5 (illustrated by arrow 106 in FIG. 7). Similarly, node 1 is programmed with node number 6 in its configuration register 26B (not labeled), and thus uses the alias region for node number 6 (illustrated by arrow 108 in FIG. 7). Accordingly, node 0 treats the alias region corresponding to node number 6 as an external region (and generates a global transaction on the global interconnect 22 in response to a local transaction on the interconnect 42 having an address in that alias region), and node 1 treats the alias region corresponding to node number 5 as an external region (and generates a global transaction on the global interconnect 22 in response to a local transaction on the interconnect 42 having an address in that alias region). Other alias regions, such as those shown in FIG. 4, may also be treated as external by each node.

For example, an access to a location 110 may use an address A. If the access to address A is performed by an agent in the node 0, the access may be recognized as aliased to the local region 74 in the node 0 (particularly, address A may be aliased to location 114). If the location 114 corresponds to a local I/O device or interface circuit, the transaction may be completed locally in the node 0. If the location 114 corresponds to a memory location and internode coherency is not desired (e.g., the transaction is indicated non-coherent on the interconnect 42), the transaction may also be completed locally. If the location 114 corresponds to a memory location and internode coherent is desired (e.g., the transaction is indicated coherent on the interconnect 42), CC-NUMA global transactions may be generated to maintain internode coherency. If the access to address A is performed by an agent in the node 1, the node 1 recognizes address A as being external. If the transaction is coherent and the node 1 has appropriate ownership of the location 110 to complete the transaction locally, the node 1 may complete the transaction locally. Otherwise, the node 1 transmits a global transaction (either CC-NUMA coherent or HT, as appropriate) on the global interconnect 22. The transaction is mapped through the BAR corresponding to the node 0 alias region (labeled N0 BAR in FIG. 7) to the location 110. Thus, the same numerical address may be used in both nodes 0 and 1 to access the location 110 (aliased to location 114).

Similarly, an access to a location 112 may use an address B. If the access to address B is performed by an agent in the node 1, the access may be recognized as aliased to the local region 74 in the node 1 (particularly, address B may be aliased to location 116). If the location 116 corresponds to a local I/O device or interface circuit, the transaction may be completed locally in the node 1. If the location 116 corresponds to a memory location and internode coherency is not desired (e.g., the transaction is indicated non-coherent on the interconnect 42), the transaction may also be completed locally. If the location 116 corresponds to a memory location and internode coherent is desired (e.g., the transaction is indicated coherent on the interconnect 42), CC-NUMA global transactions may be generated to maintain internode coherency. If the access to address B is performed by an agent in the node 0, the node 0 recognizes address B as being external. If the transaction is coherent and the node 0 has appropriate ownership of the location 112 to complete the transaction locally, the node 0 may complete the transaction locally. Otherwise, the node 0 transmits a global transaction (either CC-NUMA coherent or HT, as appropriate) on the global interconnect 22. The transaction is mapped through the BAR corresponding to the node 1 alias region (labeled N1 BAR in FIG. 7) to the location 112. Thus, the same numerical address may be used in both nodes 0 and 1 to access the location 112 (aliased to location 116).

Additionally, in this example, the alias regions are aligned to the numerical address in their corresponding BARs. In so doing, the same numerical address is also used on the global interconnect 22 to access a location in the alias regions. However, other embodiments may not have the global address numerically equal to the local address.

Figure 8:
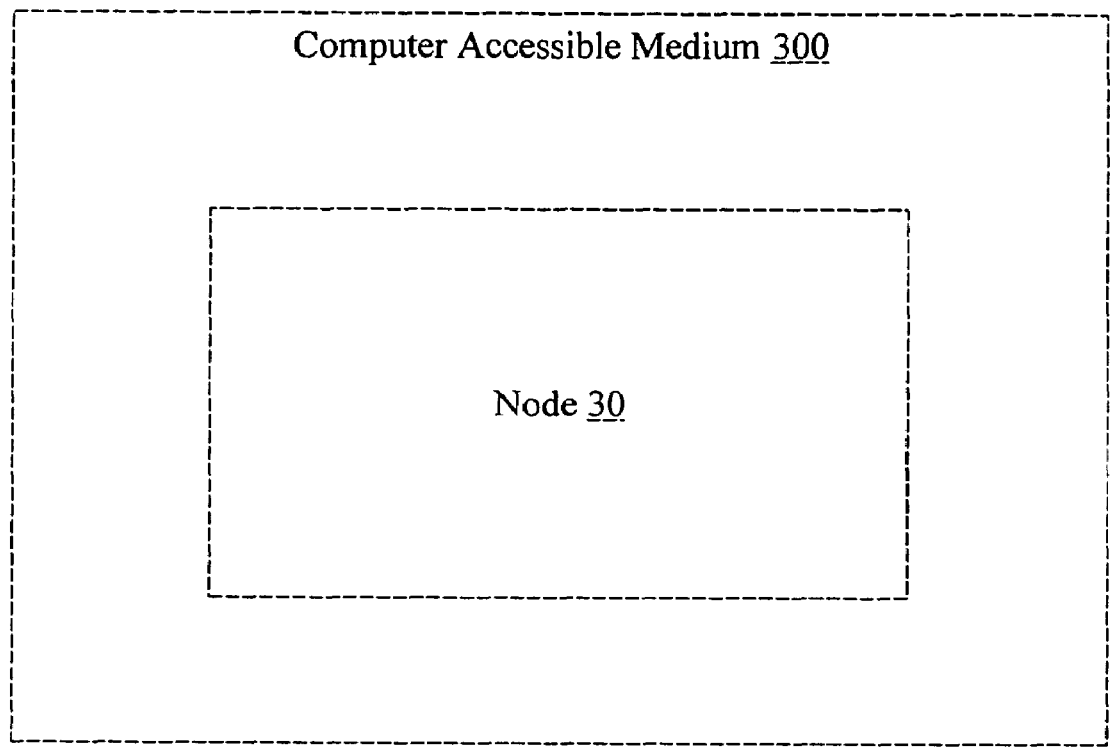
FIG. 8 is a block diagram of a computer accessible medium.

Turning next to FIG. 8, a block diagram of a computer accessible medium 300 including one or more data structures representative of the circuitry included in the node 30 is shown. Generally speaking, a computer accessible medium may include any media accessible by a computer during use to transfer data and/or instructions to/from the computer. The computer accessible medium may include storage media such as magnetic or optical media, e.g., disk (fixed or removable), CD-ROM, or DVD-ROM, various recordable or rewritable CD or DVD formats, volatile or non-volatile memory media such as RAM (e.g., SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool, which may synthesize the description to produce one or more netlist(s) comprising lists of gates from a synthesis library. The netlist(s) comprise a set of gates, which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 30, other embodiments may include a representation of any portion of the node 0 (e.g., processors 32A-32N, L2 cache 56, memory controller 34, memory bridge 52, configuration register 26, interface circuits 40A-40C, I/O bridge 61, and/or I/O interface circuit 62, etc.). Other embodiments may further include a representation of the circuitry forming the system 20 as shown in FIG. 2C.

Figure 9:
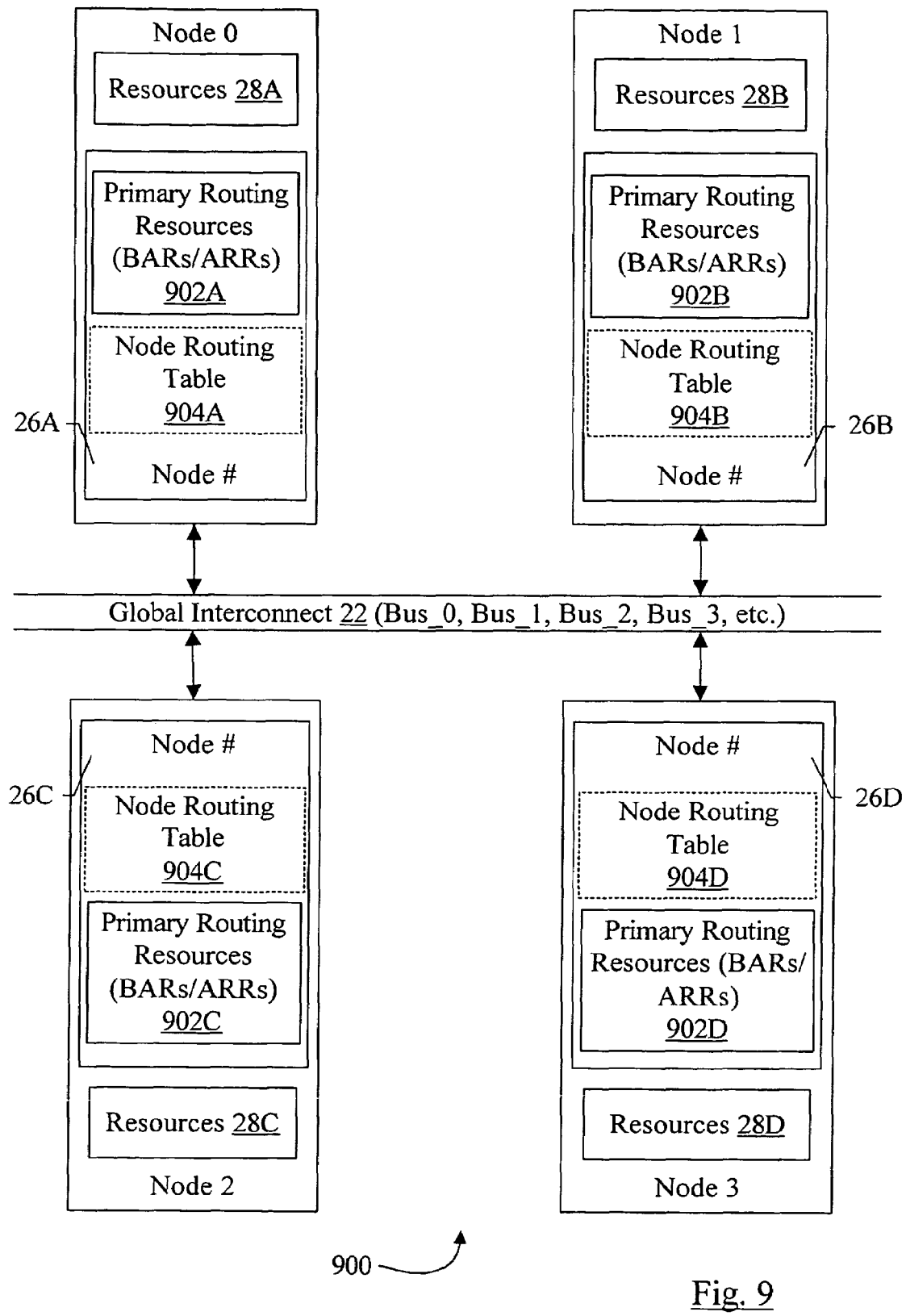
FIG. 9 is a block diagram illustrating the structure of a plurality of processing devices that operate according to one aspect of the present invention.

Referring now to FIG. 9, another embodiment of the present invention with regard to a system 900 that shares resources is described. The system 900 of the present invention includes a plurality of nodes, node 0, node 1, node 2, and node 3. The system 900 shares some similarities to the system 20 of FIG. 2C and, for those common elements, a common numbering scheme is used. Nodes 0-3 each include resources 28A-28D, respectively, and registers 26A-26D, respectively. However, as contrasted to the structure of FIG. 1C, each register 26A-26D includes not only primary routing resources 902A-902D, respectively which include BARs and ARRs, but also includes a node routing table 904A-904D, respectively. The contents of these registers are employed to route peripheral bus transactions (on the global interconnect 22).

Figure 12A:
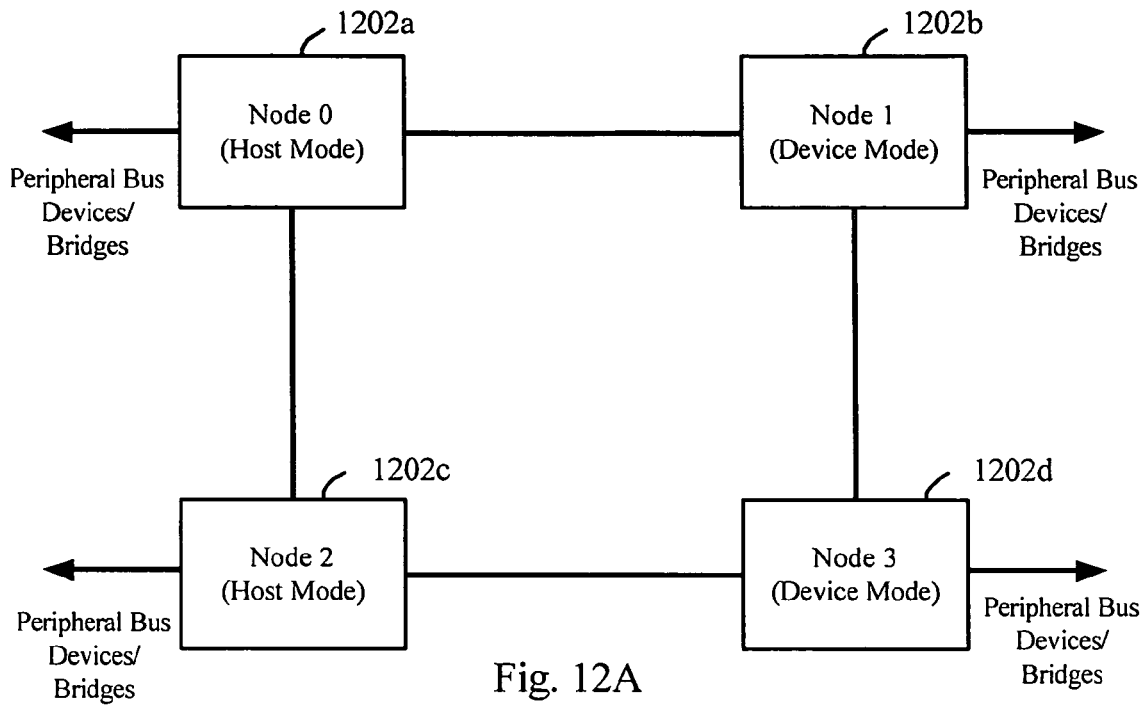
FIGS. 12A and 12B are block diagrams illustrating arrangements of intercoupled nodes that operate according to one embodiment of the present invention.
Figure 12B:
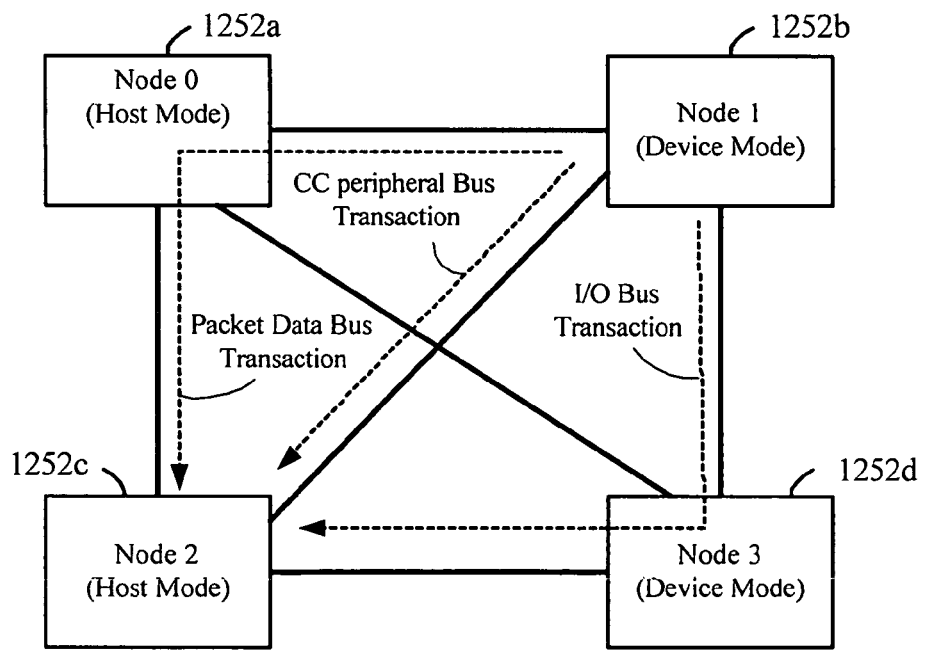
Figure 13:
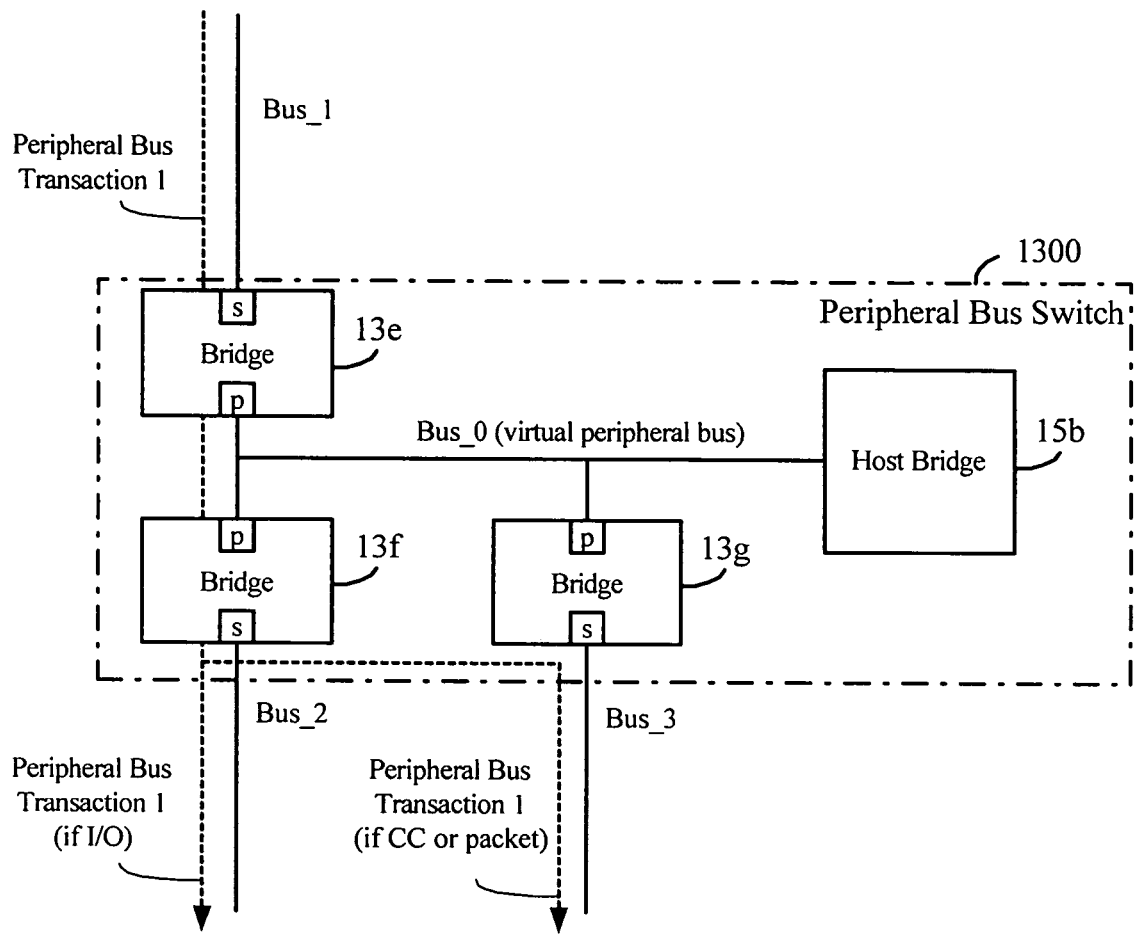
FIG. 13 is a block diagram illustrating in more detail operation of an embodiment of the present invention with respect to a peripheral bus switch.

The global interconnect 22 illustrated in FIG. 9 represents the peripheral bus fabric2 200 and 201 previously shown in various FIGS. 1A-2B, respectively, and as is shown in FIG. 13. The global interconnect 22 has a plurality of buses, e.g., bus_0, bus_1, bus_2, bus_3, etc., and may include a number of different interconnect paths between node 0, node 1, node 2, and node 3. Examples of these differing interconnect paths will be shown in FIG. 12 and FIG. 13. Each of the nodes includes a plurality of peripheral bus interfaces coupling the node to the peripheral bus fabric. FIG. 3 illustrates a node 30 having a plurality of peripheral bus interfaces 40A, 40B, and 40C. Structures having multiple peripheral bus connections were also illustrated in FIGS. 2A and 2B and will also be shown in FIGS. 12A, 12B, and 13.

Node 0 includes primary routing resources 902A that are programmable with a plurality of address ranges. Node 0 also includes a node routing table 904A that is programmable with a plurality of override indications. In routing a peripheral bus transaction among its plurality of peripheral bus interfaces (and resources 28A), node 0 determines a primary routing based upon an address of the peripheral bus transaction and primary routing resources 902A contents. Further, in some operations, the node also determines an override routing based upon a destination node ID of the peripheral bus transaction and the node routing table 904A contents. The node may employ the override routing instead of the primary routing to the peripheral bus transaction. These routing operations will be described in more detail with reference to FIGS. 10, 11, 12A, 12B, and 13.

Node 1, node 2, and node 3 include similar components, including resources 28B, 28C, and 28D and registers 26B-26D. Registers 26B-26D include primary routing resources 902B-902D and node routing tables 904B-904D, respectively. Each of the nodes also includes a node ID number. Each node ID number corresponds to the particular processing device/node. These nodes also routes peripheral bus transactions based upon not only the address of the peripheral bus transaction and primary routing resources contents (primary routing) but also a node ID of an intended destination of the peripheral bus transaction and node routing table contents (override routing).

Figure 10:
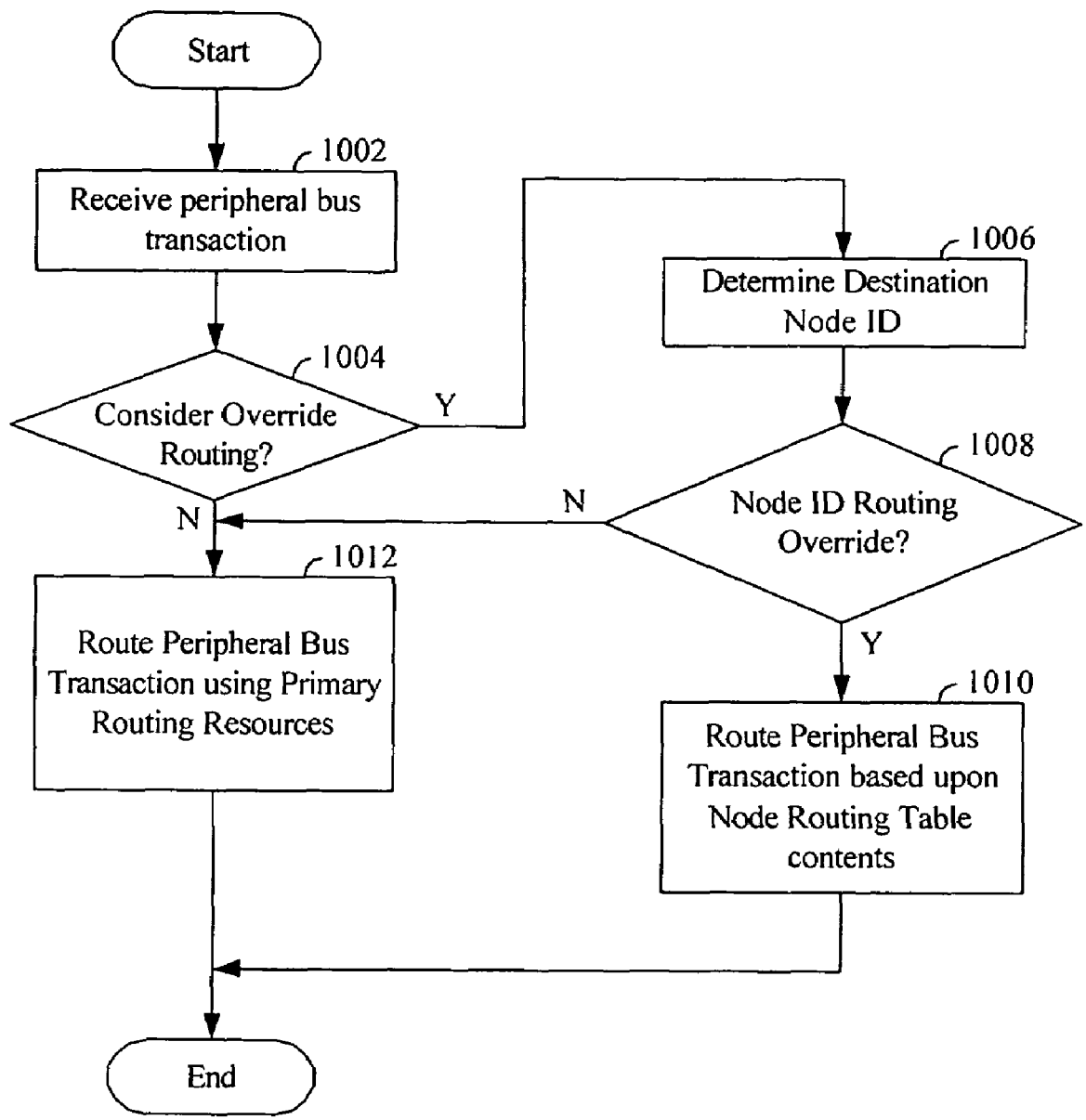
FIG. 10 is a logic diagram illustrating operation according to one aspect of the present invention for routing peripheral bus transactions.

Referring now to FIG. 10, the operation of a processing device (node) constructed according to an embodiment of the present invention is illustrated. The processing device has a plurality of peripheral bus interfaces and receives a peripheral bus transaction at one of its peripheral bus interfaces (step 1002). Upon receipt of the peripheral bus transaction at a particular peripheral bus interface, routing of the input transaction is determined. As part of this routing determination, the node determines a transaction type, e.g., whether the peripheral bus transaction is an input/output transaction, a packet transaction, or a cache coherency transaction. After determining the transaction type, the processing device determines whether override routing should be considered for the peripheral bus transaction (step 1004). According to one aspect of the present invention, primary routing is always employed for some, but not all transaction types. For example, primary routing of packet-based transactions may always be used. However, primary routing of cache coherency peripheral bus transactions and/or input/output peripheral bus transactions may be overridden based upon node routing table contents.

When override routing is considered, the processing device determines a destination node ID for the peripheral bus transaction (step 1006). This determination may be made based upon a most significant number of bits, e.g., four bits, of the destination address of the peripheral bus transaction. The processing device then performs a look-up in the node routing table on the basis of a node ID of the peripheral bus transaction. Typically, the node routing table will have entries for each peripheral bus interface serviced by the processing device. As will be described further with respect to FIG. 11, it may be determined that override routing is disabled for the particular transaction (step 1008). If such is the case, or if override routing was not considered at step 1004, the peripheral bus transaction is routed based upon the destination address of the peripheral bus transaction and primary routing resources contents (step 1012). However, if the node routing table requires the primary routing to be overridden, the peripheral bus transaction is routed based upon the node ID and node routing table contents (step 1010). From both steps 1012 and 1010, operation ends for the particular peripheral bus transaction.

Referring now to FIG. 11, the node routing table 1100 has entries for each peripheral bus interface. In considering the node routing table entries it is useful to consider the peripheral bus switch 17 of FIG. 2A and the structure of FIG. 3. With the peripheral bus switch 17, bridge 13e is instantiated at least partially by a corresponding peripheral bus interface, e.g., HT interface 40A. Likewise bridges 13f and 13g are instantiated at least partially by HT interfaces 40B and 40C, respectively. In this case, each of the bridges 13e-13g has corresponding primary routing resources contents and corresponding node routing table contents. These register contents may be maintained in separate registers or in a common register. In any case, when a single node has multiple peripheral bus interfaces, transactions must be processed and routed within the node according to the corresponding stored register contents. As should be evident to the reader, peripheral bus transactions having a common destination peripheral bus address may be routed differently through the peripheral bus switch 17 based upon their transaction type, primary routing resources contents, and node routing table contents. This teaching will be described in more detail with reference to FIG. 12B.

When the processing device determines a node ID corresponding to the peripheral bus transaction, it may do so by extracting the four most significant bits of the peripheral bus transaction destination address and mapping the bits to a particular node ID. As shown in FIG. 11, fifteen particular nodes are supported within the node routing table 1100. For each of the nodes there is an input/output override bit and an input/output primary/secondary indication. The input/output override bit corresponding to the node indicates whether or not the node routing table routing will override primary address routing. Further, the primary/secondary indication for the particular node for input/output transactions indicates whether the peripheral bus transaction is to be directed to the primary side or to the secondary side of the bridge.

Referring to FIG. 2B, for example, a transaction is received at bridge 13e on its secondary port and is intended for another of the devices 11j, 11k, or 11m on bus_1. In such case, the transaction will be routed out the secondary port of bridge 13e to bus_1. However, if the peripheral bus transaction were intended for device 11n or 11o, the peripheral bus transaction would be routed out the primary port of bridge 13e. When the peripheral bus fabric is not a tree structure as is the structure of FIG. 2B, peripheral bus transactions may take differing paths on the peripheral bus fabric to reach a desired destination. The information contained in the node routing table may be employed with the peripheral bus structures of FIG. 12A and/or FIG. 12B to designate a primary/secondary port for override routing that routes peripheral bus transactions along differing paths to a common destination.

Further included in the node routing table for each node is an entry corresponding to cache coherency transactions, i.e., a cache coherency override bit. The cache coherency override bit is analogous to the input/output override bit, to indicate whether primary routing is to be overridden for cache coherency peripheral bus transactions. Likewise, the node routing table includes a primary/secondary indication for the particular entry. In this case, the primary/secondary indication will indicate whether or not the override routing causes the transaction to be routed out of the primary port or the secondary port of the receiving bridge of the particular bridge.

FIG. 12A illustrates a non-tree peripheral bus fabric that may be serviced according to the present invention. The structure of FIG. 12A may be referred to as a square structure having node 0 (1202*a*), node 1 (1202*b*), node 2 (1202*c*), and node 3 (1202*d*). Each of the nodes 0 through 3 includes three peripheral bus interfaces. Because the structure of FIG. 12A is a non-tree structure, the peripheral bus structure must have at least one double-hosted bus/chain, in this case, node 0 and node 2 both operate in a host mode so that the non-tree structure may be supported. As shown, each of the nodes couples to two other of the nodes via two corresponding peripheral bus interfaces and also couples to other devices via another corresponding peripheral bus interface. This square structure provides redundancy in communication paths among the nodes and also provides robustness in operation in that a single failed node will not cause a complete failure of the peripheral bus fabric.

Each of the nodes 0 through 3 includes both a primary routing resources and a node routing table that includes entries for one or more of its peripheral bus interfaces. The operation of the structure of FIG. 12A is configured to avoid deadlock and to most efficiently use the available peripheral bus fabric bandwidth that couples the nodes. In such case, the shared resources of these nodes may be efficiently shared to increase the overall productivity of the system and includes a plurality of nodes.

Referring to FIG. 12B, each node 0 (1252*a*), node 1 (1252*b*), node 2 (1252*c*), and node 3 (1252*d*), also includes three peripheral bus interface ports. However, in the structure of FIG. 12B, the ports are used only to interconnect the nodes within the system. In this structure, each of the nodes has a direct connection to each other of the nodes. The peripheral bus transactions must be managed carefully to avoid deadlock in the system (as well as the system of FIG. 12A). One way in which deadlock can be avoided is to enumerate all possible cycles of peripheral bus transactions within the structure and to make sure that for each cycle in each direction there is at least one node that does not forward transactions. While it is permitted that each node can service or sink transactions in any of its links, no external transaction should be forwarded through the particular node in a single particular direction. This will avoid deadlock in the operation.

The processing devices illustrated in FIG. 12B service input/output transactions, cache coherency transactions, and packet data transactions via the peripheral bus fabric. In the example of FIG. 12B, the flow of transactions from node 1 to node 2 may take three separate paths, depending upon the type of transaction. A first path is direct from node 1 to node 2. A second path is from node 1 through node 0 to node 2, and a third path is from node 1 through node 3 to node 2. By using the primary routing resources and the node routing table of the present invention, cache coherency operations may be routed directly from node 1 to node 2, packet data transactions may be routed via node 0 from node 1 to node 2, and input/output transactions may be routed from node 1 through node 3 to node 2. Because ordering is not a requirement in cache coherency operations, the transactions may take the shortest path. However, because ordering of input/output transactions is important and required within a structure of the type of FIG. 12B, it is a requirement that these transactions be routed along a consistent path to maintain order of the transactions.

FIG. 13 is a block diagram illustrating in more detail operation of an embodiment of the present invention with respect to a peripheral bus switch. As shown in FIG. 13, transactions entering a peripheral bus switch 1300 and intended for a common destination may take separate paths through the switch and the peripheral bus fabric. For example, an input/output transaction arriving as peripheral bus transaction 1 would be routed out bus_2 via bridge 13*e* and 13*f* using a first node routing table bypass operation. Alternately, a peripheral bus transaction that is a cache coherency or packet transaction arriving on peripheral bus 1 and intended for the same destination may be routed via bridge 13*e* and 13*g* onto bus_3 of the peripheral bus fabric. The structure of the present invention allows for this alternate routing scheme based upon transaction type and whether or not override routing should be performed.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A processing device that emulates a peripheral bus switch, the processing device comprising:
   at least one processing unit;
   memory;
   an internal bus operably coupled to the at least one processing unit and the memory;
   a plurality of input ports operably coupled to the internal bus that receive peripheral bus transactions; and
   a plurality of output ports operably coupled to the internal bus that transmit peripheral bus transactions;
   wherein the at least one processing unit executes a plurality of instructions to cause the processing device to emulate:
      a virtual peripheral bus;
      a first bridge operably coupled on a first side to the virtual peripheral bus and that supports connection on a second side to a peripheral bus fabric and to a root host bridge through a root bus;
      a second bridge operably coupled on a first side to the virtual peripheral bus and that supports connection on a second side to the peripheral bus fabric; and
      a configurable host bridge operably coupled to the virtual peripheral bus, wherein the configurable host bridge supports a host mode of operation and supports a device mode of operation, and wherein during the device mode of operation, the root host bridge operates as a root bridge and transacts with the virtual peripheral bus to access devices of the peripheral bus fabric and in which the configurable host bridge is accessed by the root host bridge as one of the devices of the peripheral bus fabric, but during the host mode of operation, the configurable host bridge is configured to operate as a root bridge and the virtual peripheral bus is configured as a root bus to access the devices of the peripheral bus fabric instead of the root host bridge.

2. The processing device of claim 1, wherein in the host mode of operation the emulated configurable host bridge configures devices of the peripheral bus fabric.

3. The processing device of claim 1, wherein in the device mode of operation
the root host bridge configures the peripheral bus fabric.

4. The processing device of claim 3, wherein in the device mode of operation the emulated virtual peripheral bus appears to be a peripheral bus of the peripheral bus fabric.

5. The processing device of claim 4, wherein in the device mode of operation the emulated virtual peripheral bus appears to the root host bridge to be a Peripheral Component Interconnect (PCI) bus, a PCI-X bus, a PCI Express bus, or a Hyper Transport bus of the peripheral bus fabric.

6. The processing device of claim 1, wherein at least some components of the peripheral bus fabric share memory space with at least one other host bridge coupled via the peripheral bus fabric.

7. The processing device of claim 1, wherein:
at least a portion of the peripheral bus fabric supports at least one version of the Hyper Transport specification; and
the emulated virtual peripheral bus appears to support one or more versions of the Peripheral Component Interconnect (PCI) specification, the PCI-X specification, or the PCI Express specification.

8. In a processing device having at least one processing unit, a memory, an internal bus operably coupled to the at least one processing unit and to the memory, a plurality of input ports operably coupled to the internal bus, and a plurality of output ports operably coupled to the internal bus, a method for supporting peripheral bus switch operations comprising:
emulating a virtual peripheral bus;
bridging input peripheral bus transactions received on the plurality of input ports to the emulated virtual peripheral bus;
bridging output peripheral bus transactions from the emulated virtual peripheral bus to the plurality of output ports;
emulating a configurable host bridge that is operably coupled to the virtual peripheral bus to operate in a host mode of operation and in a device mode of operation, wherein when operating in the device mode of operation, a root host bridge, coupled to the virtual peripheral bus through a root bus, operates as a root bridge and transacts with the virtual peripheral bus to access devices of a peripheral bus fabric and in which the configurable host bridge is accessed by the root host bridge as one of the devices of the peripheral bus fabric, but when operating in the host mode of operation, the configurable host bridge is configured to operate as a root bridge and the virtual peripheral bus is configured as a root bus to access the devices of the peripheral bus fabric instead of the root host bridge.

9. The method of operation of claim 8, wherein in the host mode of operation, the configurable host bridge configures devices of the peripheral bus fabric.

10. The method of operation of claim 8, wherein in the device mode of operation
the root host bridge configures the peripheral bus fabric.

11. The method of operation of claim 10, wherein in the device mode of operation, the virtual peripheral bus appears to be a peripheral bus of the peripheral bus fabric.

12. The method of operation of claim 11, wherein in the device mode of operation, the virtual peripheral bus appears to the root host bridge to be a Peripheral Component Interconnect (PCI) bus, a PCI-X bus, a PCI Express bus, or a Hyper Transport bus of the peripheral bus fabric.

13. The method of operation of claim 8, wherein the configurable host bridge shares a memory space with at least one other host bridge coupled via the peripheral bus fabric.

* * * * *